No. 802,094.　　　　　　　　　　　　　　PATENTED OCT. 17, 1905.
J. S. BUBB.
AUTOMATIC FLUID PRESSURE BRAKE SYSTEM.
APPLICATION FILED MAR. 9, 1903.

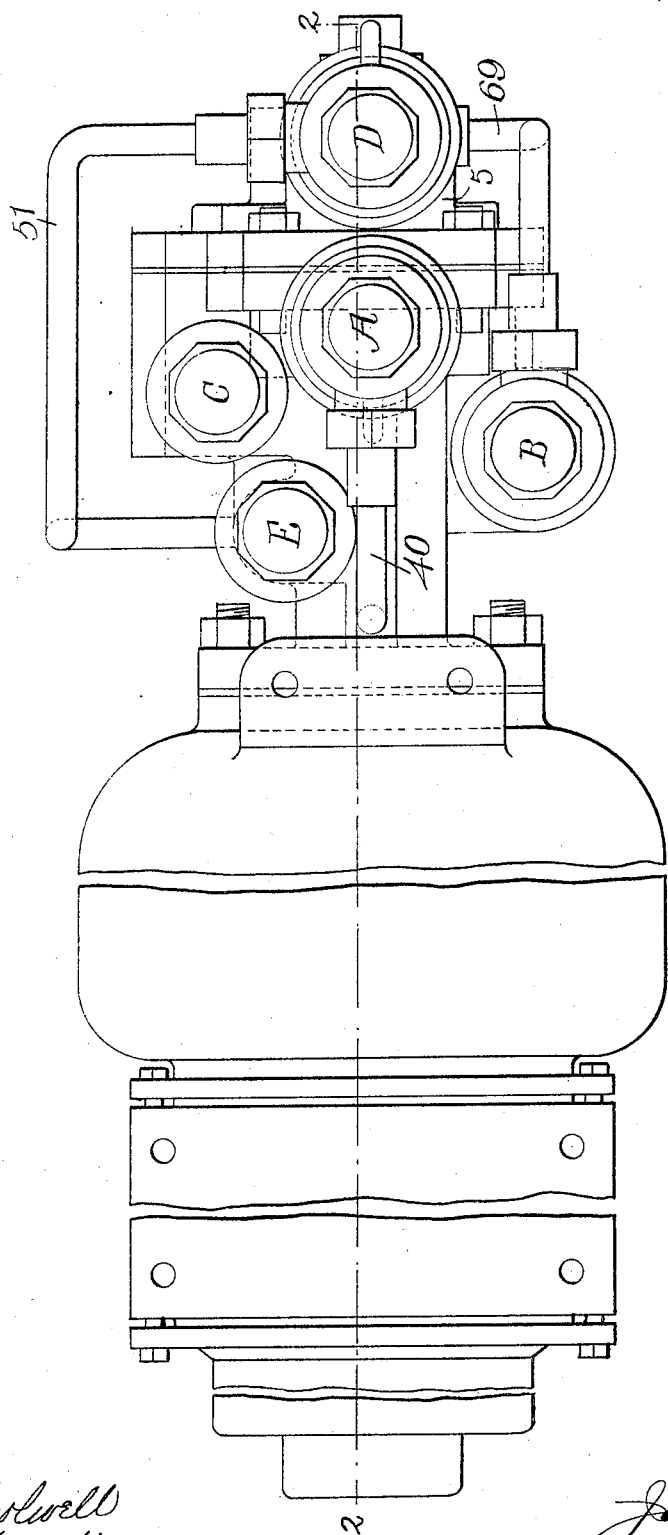

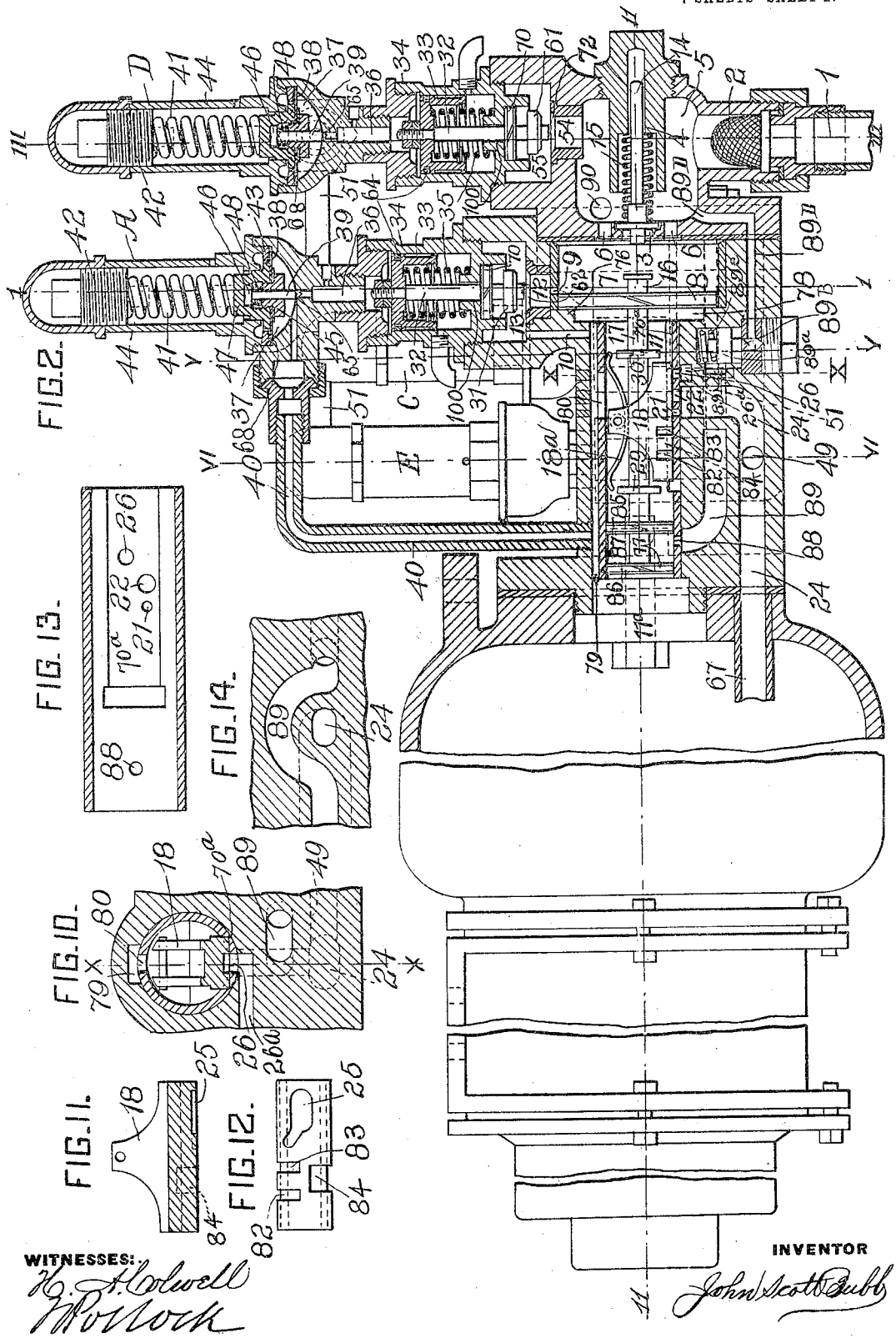

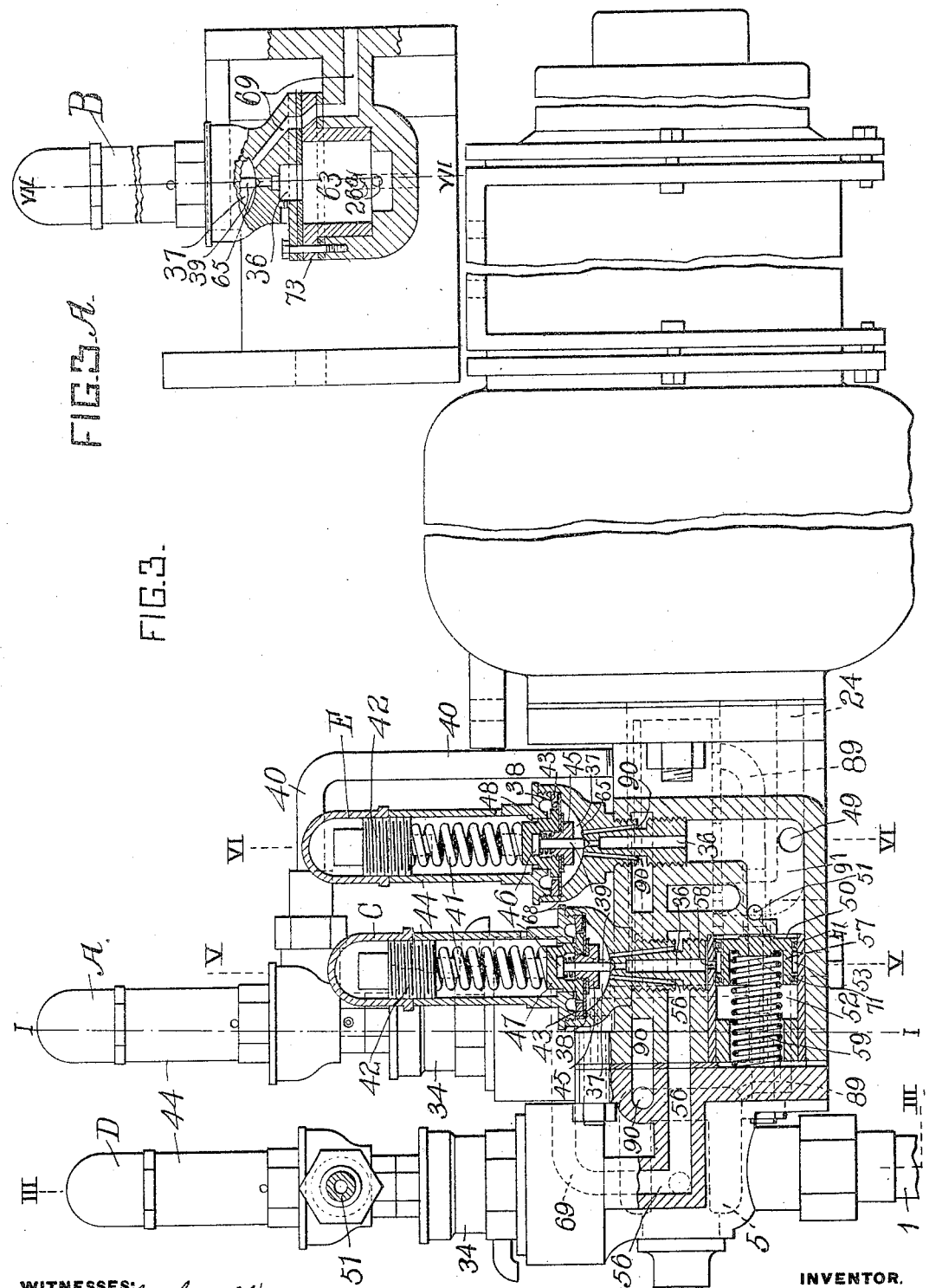

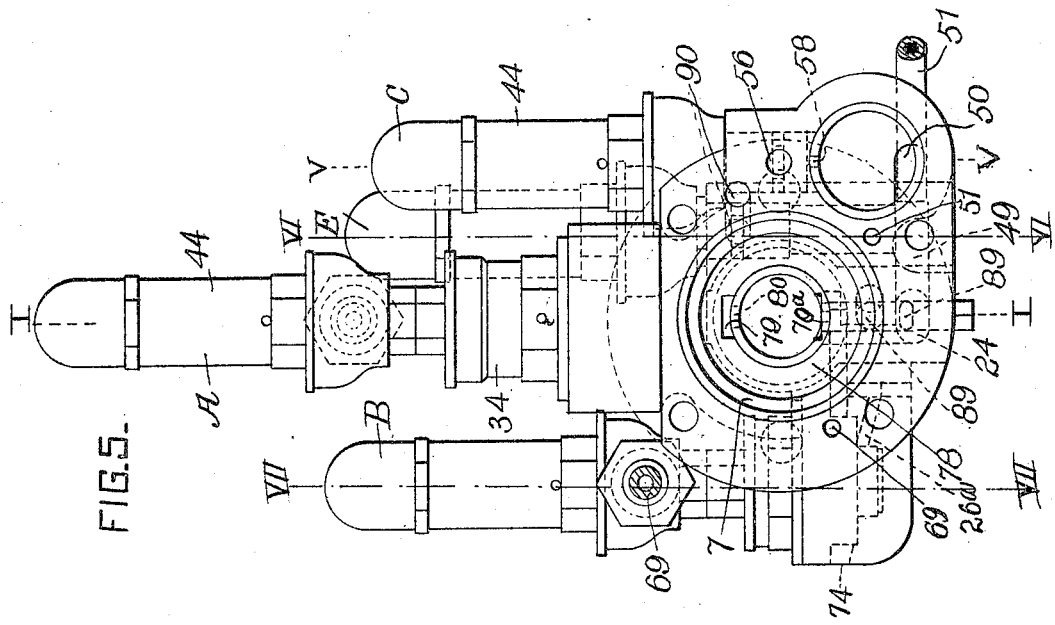
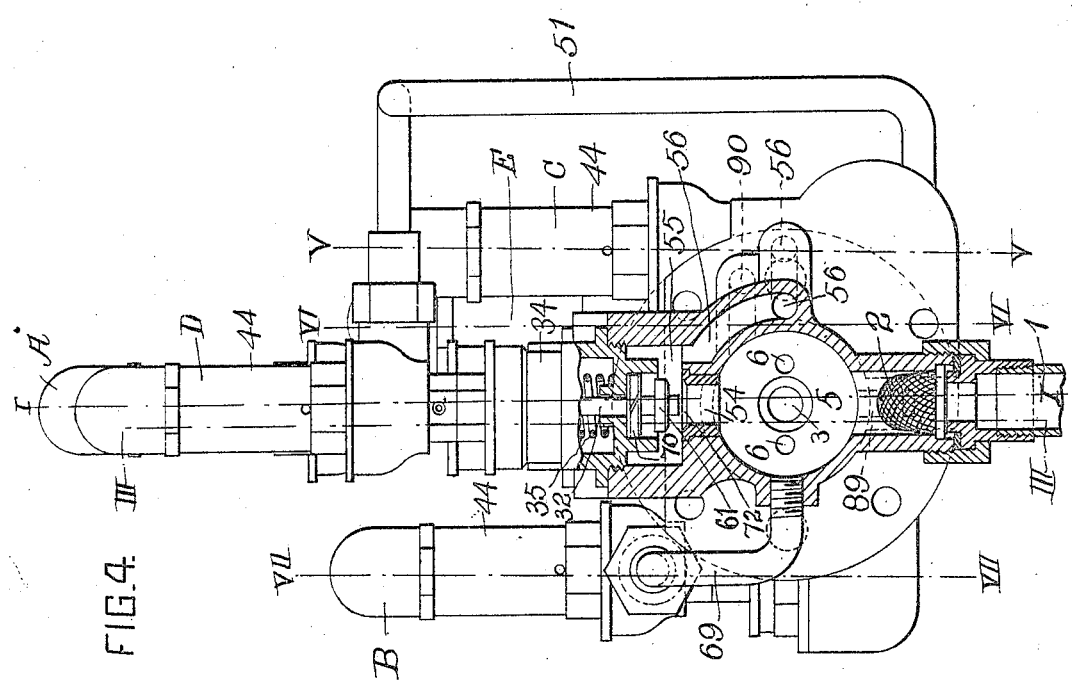

7 SHEETS—SHEET 5.

WITNESSES:

INVENTOR

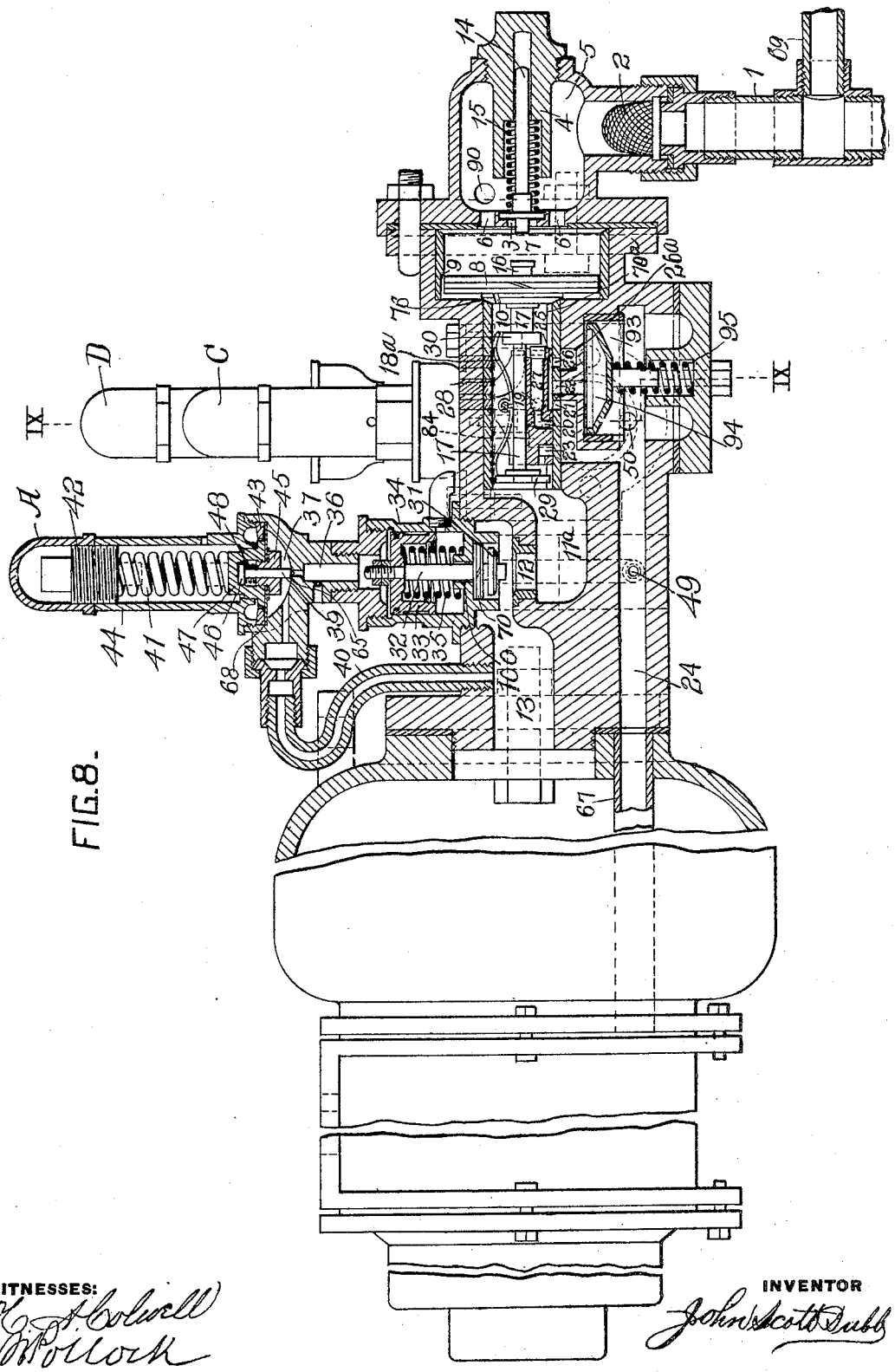

No. 802,094. PATENTED OCT. 17, 1905.
J. S. BUBB.
AUTOMATIC FLUID PRESSURE BRAKE SYSTEM.
APPLICATION FILED MAR. 9, 1903.
7 SHEETS—SHEET 7.
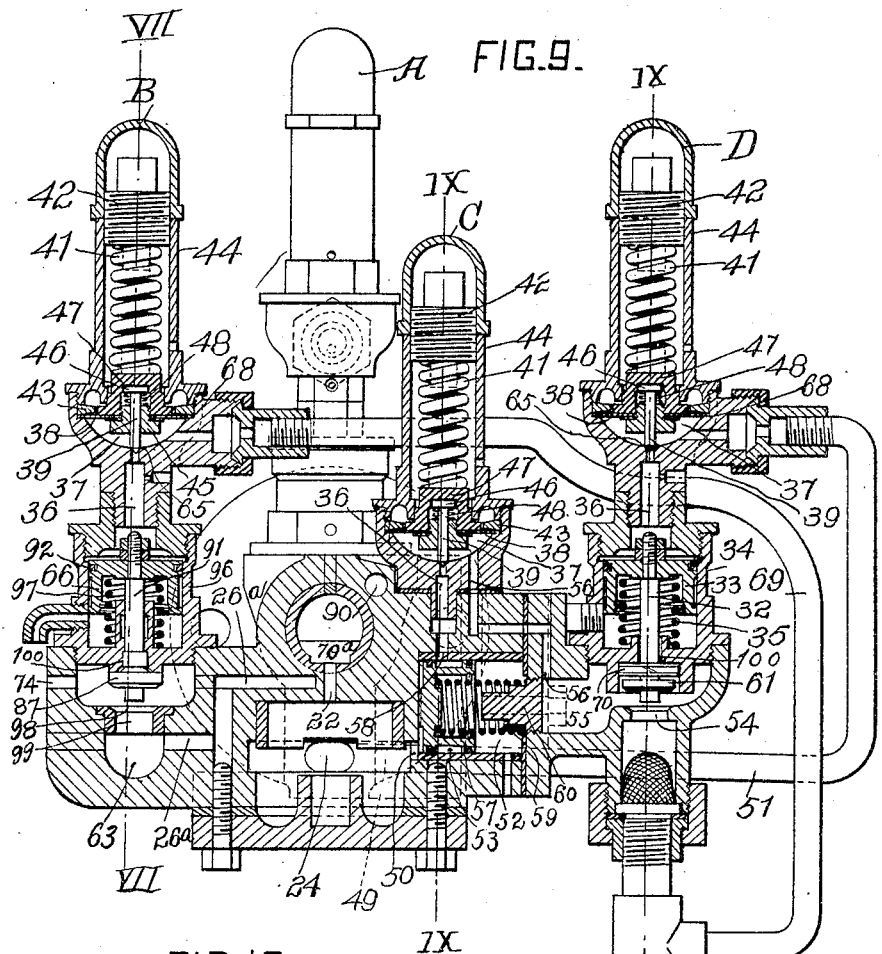
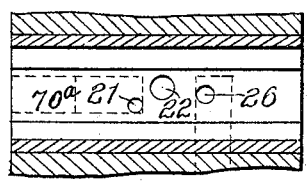
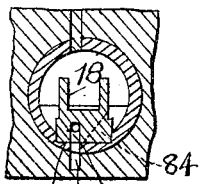
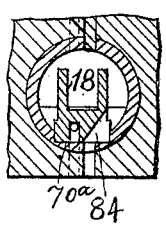
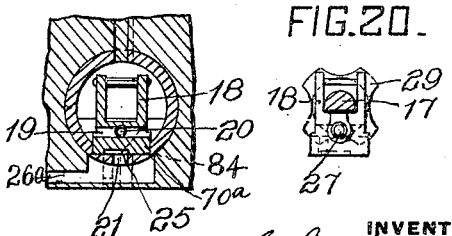
WITNESSES:
INVENTOR
John Scott Bubb

UNITED STATES PATENT OFFICE.

JOHN SCOTT BUBB, OF KITTANNING, PENNSYLVANIA.

AUTOMATIC FLUID-PRESSURE BRAKE SYSTEM.

No. 802,094.      Specification of Letters Patent.      Patented Oct. 17, 1905.

Application filed March 9, 1903. Serial No. 147,042.

*To all whom it may concern:*

Be it known that I, JOHN SCOTT BUBB, a citizen of the United States, residing at Kittanning, in the county of Armstrong and State of Pennsylvania, have invented a new and useful Improvement in Automatic Fluid-Pressure Brake Systems, of which the following is a full, clear, and exact description.

My invention described herein relates to certain improvements in automatic fluid-pressure brake systems; and it has for its object the production of devices for so controlling the fluid-pressure in the main service-valve as to enable the maintenance and reduction of predetermined excess pressure in the main train-pipe passages without operating the main service-valve.

It is a further object of the invention to so control the fluid-pressure in the main service-valve as to enable the closing and opening of the exhaust from the brake-piston cylinder by the maintenance and reduction of excess fluid-pressure in the main train-pipe passages without operating the main service-valve.

It is a further object of the invention to so control the fluid-pressure in the main service-valve as to enable the application of any excess fluid-pressure to the brake-piston cylinder and a reduction of such excess pressure to normal without operating the main service-valve.

It is a further object of the invention to so control the fluid-pressure in the main service-valve as to enable the application of an excess fluid-pressure to the brake-piston cylinder and to allow a reduction of such pressure in the brake-piston cylinder to a predetermined pressure below normal without operating the main service-valve.

It is a further object of the invention to so control the fluid-pressure in the main service-valve as to enable the maintenance of an excess fluid-pressure in the main train-pipe passages and a reduction of such excess fluid-pressure by the coupling of an additional car without operating the main service-valve.

It is a further object of the invention to provide in service or graduated applications for the maintenance of a predetermined or necessary pressure in the brake-piston cylinder and at the same time to effect a charging of the auxiliary reservoir with fluid under pressure from the main train-pipe, which is under the control of the engineer.

It is a further object of the invention to control the admission of fluid under pressure from the main train-pipe into the brake-piston cylinder.

It is a further object of the invention to provide in service application for the cutting-off of fluid under pressure in the main train-pipe from the brake-piston cylinder when the fluid under pressure has reached a predetermined point.

It is a further object of the invention to provide for a high-fluid-pressure quick-action application of the brakes.

It is a further object of the invention to provide for automatic governing or regulating means to govern or regulate the fluid under pressure on each car.

It is a further object of the invention to provide automatic means to make a high-fluid-pressure-brake application of the brakes by the high-pressure fluid in the main train-pipe without using or affecting the fluid under pressure in the auxiliary reservoir, which may be kept as a reserve to the fluid under pressure in the main train-pipe.

It is a further object of my invention to provide a storage-chamber for train-pipe pressure and means for bringing this chamber in communication with the brake-piston cylinder when an emergency application of the brakes is made.

It is a further object of my invention to provide automatic means to close the exhaust-passage from the brake-piston cylinder to atmosphere before or after a brake application.

It is also the object of my invention to provide automatic means operative by fluid-pressure to close the exhaust-passage from the brake-piston cylinder to atmosphere during the time of a brake application.

It is a further object of the invention to provide automatic means to make an ordinary or service application of the brakes by fluid-pressure from the main train-pipe without affecting in any way the supplemental governing or regulating valves which govern the flow of fluid in the auxiliary reservoir to and from the brake-piston cylinder.

It is a further object of the invention to provide automatic means for exhausting fluid under pressure from the brake-piston cylinder after application has been made without shifting the service slide-valve.

It is a further object of the invention to provide automatic means to establish an equal fluid-pressure at the same time in the main train-pipe in the auxiliary reservoir and in the brake-piston cylinder.

It is a further object of the invention to provide automatic means to govern the fluid-pressure in the main train-pipe passages on each car.

It is a further object of the invention to provide automatic means to govern or regulate the fluid-pressure in the main service-valve and the auxiliary reservoir on each car.

It is a further object of the invention to provide automatic means to govern or regulate the fluid-pressure in the brake-piston cylinder on each car.

It is a further object of the invention to provide automatic means to permit the coupling of a rear train-pipe uncharged with fluid under pressure to a main train-pipe charged with fluid under pressure without making an application of the brakes.

I will now describe my invention, so that others skilled in the art may manufacture and use the same, reference being had to the accompanying drawings, forming part of this specification, in which—

Figure 1 is a top plan view of my automatic governor-brake-valve device. Fig. 2 is a view, partly in section and partly in elevation, of the same, the plane of section being indicated by the line II II, Fig. 1. Fig. 3 is a sectional elevation on a plane indicated by the line III III, Figs. 2 and 4. Fig. 3$^A$ is a longitudinal view of the main chest or casing, partly in elevation and partly in section, with a modified supplemental governor-retaining-valve mechanism B attached. Fig. 4 is a transverse view, partly in section and partly in elevation, on the plane of the line III III, Figs. 2 and 3. Fig. 5 is an end view in elevation of the main-valve casting, the front chamber of the casting being removed, on the plane of the line II, Figs. 2, 3, and 4, main service-valve removed. Fig. 6 is a sectional and elevation view on the plane of the line V V, VI VI, and VII VII, respectively, of Figs. 2, 3, 4, and 5, main service-valve removed. Fig. 6$^A$ is a modified end view of the chest or casing end chamber, partly in elevation and partly in section, with the supplemental governor-valve mechanism D attached. Fig. 7 is a sectional view on the plane of the lines VI VI of Figs. 2, 3, 4, 5, and 6, main service-valve removed. Fig. 7$^A$ is a part of the longitudinal section of the main chest or casing with a modified supplemental governor-valve mechanism A attached, partly in section and partly in elevation, on a plane of the lines I I, Figs. 2, 3, 4, and 5. Fig. 8 is a view similar to Fig. 2, illustrating a modification of my improvement. Fig. 9 is a transverse section of the construction shown in Fig. 8, the plane of the section being indicated by the line IX IX, Fig. 8, main service-valve removed. Fig. 10 is a sectional view of the main valve and adjacent parts on the plane of the line X X, Fig. 2. Figs. 11 and 12 are sectional and bottom plan views of the main service slide-valve. Fig. 13 is a sectional plan view of the piston-valve and service-slide-valve casing. Fig. 14 is a sectional detail view on a plane passing through passage 89. Fig. 15 is a sectional plan view of the chamber shown in Fig. 8. Figs. 16, 17, 18, 19, and 20 are sectional detail views of the construction shown in Figs. 8 and 9. Fig. 21 is a plan view of the under side of the main service slide-valve of Fig. 9.

My invention consists in an improved fluid-pressure air-brake system in which there is a main service slide-valve adapted to control the flow of fluid-pressure from an auxiliary reservoir to the brake-piston cylinder and to control the exhaust therefrom. In addition to this valve there are one or more governor-valves, the purposes of which are, first, a governor-valve to so regulate the pressure in the main service-valve as to allow of the maintenance and reduction of excess fluid-pressure in the main train-pipe passages without operating the main service-valve; second, a governor retaining-valve by means of which the exhaust from the brake-piston cylinder may be closed and opened automatically, the fluid-pressure used for this purpose being either from the main train or brake pipe, which is the preferable construction, or from any other source of supply of fluid-pressure; third, a governor-valve adapted to supply a checking-brake fluid-pressure to the brake-piston cylinder, in connection with a governor-valve adapted to cut off such fluid-pressure, should it exceed a checking degree in the brake-cylinder; fourth, a governor-valve adapted to supply an excess or emergency fluid-pressure to the brake-piston cylinder from the main train-pipe; fifth, a check-valve adapted to prevent the application of the brakes when an additional car is coupled to the train; sixth, a combination of these valves and devices whereby an emergency fluid-pressure may be applied to the brake-piston cylinder, both from the auxiliary reservoir and the main train-pipe, so that the combined force of both pressures may be employed at the same time; seventh, a storage-chamber for train-pipe fluid-pressure adapted to be brought in communication with the brake-piston cylinder when an emergency application of the brakes is made; eighth, in devices whereby when the emergency-pressure is applied the pressure shall be gradually reduced with the reduction of the speed of the train.

In my improved automatic fluid-pressure brake system the main service slide-valve is shown in section in Fig. 2, and a modification of the same is shown in Fig. 8. In the drawings, 1 represents the main train-pipe; 2, a screen at the mouth thereof; 5, a main train-pipe chamber, and 6 a port leading from the main train-pipe chamber into the main-valve-piston chamber 7. In this piston-chamber is a piston 8, adapted to be reciprocated by differences of pressure on opposite sides of the piston. On the farther side of the piston 8 is a fluid-pressure chamber 78, the purpose of which is to allow such a fixed area of pressure on the rear face of the piston as will when added to the pressure area found on the rear face of the piston 86 at the other end of the piston-rod approximately equal the pressure-surface of the front face of the piston 8 in the chamber 7. Beyond the chamber 78 is the valve-chamber 11, in which is the slide-valve 18, held to its seat by a spring $18^a$. This slide-valve is provided with ports 82, 83, and 84 and adapted to register with ports 21 and 22. The ports 21 and 22 are service and emergency ports, respectively, leading to the passage 24, which connects with passage 67, that leads to the brake-piston cylinder. The port 26 leads to the exhaust-passage $26^a$. Secured to the piston-rod 16 are the collars 29 and 30, which collars are adapted to strike against the slide-valve 18 and move it back and forth on its seat 70, so as to open and close the ports 21 and 22 and establish communication by these ports between the auxiliary reservoir and the brake-piston cylinder for the purpose of making a service and emergency application of the brakes.

In my improved automatic fluid-pressure brake system the passage which leads from the main train-pipe to the main-service-valve chamber is provided with a governor-valve A, the purpose of which is to shut off communication between the main train-pipe and the main-service-valve chamber as soon as the fluid in the main-service-valve chamber has reached a predetermined pressure.

When the driving-piston 8 and the main-service-slide-valve mechanism operated thereby are in normal position to the left, the driving-piston being forced to its seat 76 by the fluid-pressure from the main train-pipe and the service-slide valve cutting off communication between the auxiliary reservoir and the brake-piston cylinder, the fluid will pass from the driving-piston cylinder 7, through the ports 9 and 12, into the governor-valve chamber 13 of the governor-valve 31, thence by the passage 10 and the by-pass 79, through the port 80, into the main service-valve chamber and auxiliary reservoir $11^a$. As soon as a predetermined fluid-pressure has been attained in the main-service-valve chamber and the connecting-passages above described and also in the passage 40 and the flexible-diaphragm chamber 37 of the governor-valve mechanism A the fluid-pressure from the said chambers and passages will raise the flexible diaphragm 38, and with it the governor-pin valve 39, from its seat 65, and thereby permit fluid-pressure to flow from the flexible-diaphragm chamber 37 into the passage 36 and thence into the governor-piston cylinder 34, where such fluid-pressure will operate upon the governor-piston 33 and force the governor-valve 31 down on its seat 62, closing the passage 12 and preventing any further flow of the fluid-pressure from the main train-pipe 1, through the driving-piston cylinder 7, to the main-service-valve chamber. The valve 31 is connected to a stem 32, having a packing-ring 70, said stem moving through a bore or guideway 100 and carrying a governor-piston 33, provided with suitable packing-rings 64 and arranged within a governor-piston cylinder 34. The valve 31 of the governor is normally held away from its seat 62 by a spring 35, which is interposed between the governor-piston and the end of the governor-piston cylinder. The head of the power end of the cylinder 34 of this governor-valve mechanism is recessed, forming a cylinder for the reception of the packing-piston 70, which is adapted to prevent the loss or flow of fluid under pressure from the main-service-valve chamber and passages in the chest or casing of the mechanism. The upper end of this governor-piston cylinder 34 communicates by a passage 36 with the flexible-diaphragm chamber 37, said chamber having a flexible diaphragm 38, carrying in a manner hereinafter described the governor-pin valve 39. The flexible-diaphragm chamber 37 is connected by a passage 40 with the main-service-valve chamber or passages leading thereto, so that the fluid under pressure in the main-service-valve chamber may flow into the flexible-diaphragm chamber 37. This governor-pin valve 39, which is carried in a disk-hub 47 in the center of the diaphragm, is normally held to its seat 65 by a regulating-spring 41, which bears against the disk-hub and has its tension so adjusted by a screw-plug 42 in the opposite end of the governor-spring chamber 44 as to hold the governor-pin valve against its seat 65 until a certain predetermined fluid-pressure—say seventy pounds—has been attained in the main-service-valve chamber. When such pressure has been attained, it overcomes the tension of the spring 41 by its pressure on the diaphragm, and by lifting the valve 39 from its seat 65 fluid is allowed to pass under seventy pounds pressure against the piston 33, which will close the valve 31 and shut off the flow of fluid from the main train-pipe through the port 12, passages 10 and 79, and main-service-valve chamber to the auxiliary reservoir $11^a$ until the pressure in the main-service-valve chamber may have been reduced below the predetermined amount of seventy pounds or normal train-pipe pressure. When the pressure has been so reduced, the spring 41 will again close the valve 39, and the pressure being removed from the piston 33 the spring 35 will raise the piston and again open the valve 31, which will remain open until the main service-valve closes under normal pressure. As soon as this closure of the main service-valve takes place and the fluid-pressure in the main service-valve and passages connected therewith is at or above normal the valve 31 closes and prevents any excess fluid-pressure above normal or any reduction of this excess pressure from a point above normal down to normal main train-pipe pressure from operating the main service-valve. As shown in Fig. 2, the edges of the flexible diaphragm 38 are clamped between shoulders on the walls 68 of the fluid-chamber 67 and the ring 43, which is formed at the base of the governor-spring chamber. The governor-pin valve 39 passes loosely through a thimble-nut 45. The latter having a threaded stem passes up through the flexible diaphragm and screws into the disk-hub 47, which disk is guided in its movements up and down by the sides of the governor-spring chamber 44. The upper end of the governor-pin valve 39 is provided with a head 46, arranged in the disk-hub 47, and is held by a spring 48 against the upper end of the recess. By this construction wear will be compensated for, and the governor-pin valve 39 will be allowed to accommodate itself to its seat 65, tightly closing the upper end of the passage 36. For general purposes and convenience of description I designate this apparatus as the "governor-valve mechanism" A.

The auxiliary reservoir having been charged in the manner stated, service application of the brakes may be effected by a reduction of fluid-pressure in the main train-pipe and driving-piston cylinder 7 to a degree less than the fluid-pressure in the auxiliary reservoir, for as soon as the pressure in the auxiliary reservoir is greater than the main-train-pipe pressure, which acts on the driving-piston 8, the pressure from the auxiliary reservoir will force the driving-piston 8 from its seat 76 or slightly to the right, thus closing the port 9, which communicates with the governor-valve mechanism A, thus preventing any further flow of fluid-pressure from the main train-pipe into the automatic governor-valve, the main-service-valve chamber, and the auxiliary reservoir. This movement of the piston 8 also opens communication between the auxiliary reservoir and the brake-piston cylinder as follows: the stem 17 of the driving-piston 8 being provided with shoulders 29 and 30, which are adapted to strike against opposite ends of the main service slide-valve 18. The chamber or cylinder 11 is made cylindrical, except on its lower side, where a flat seat $70^a$ is formed for the travel of the service slide-valve 18. Through this flat seat $70^a$ are formed ports 21, 22, and 26, the ports 21 and 22 connecting with the passage 24, leading to or communicating with the brake-piston-cylinder passage or pipe 67, as shown in Figs. 2 and 8 and as has already been described. The service slide-valve 18 is provided with ports or recesses 82, 83, and 84, which when the valve is in proper position on its seat in the valve-chamber will allow fluid-pressure to flow from the auxiliary reservoir for a service application and from the main train-pipe through the passage 89. On reduction of fluid-pressure in the main train-pipe to a point below the pressure in the auxiliary reservoir and the movement of the piston 8, as already described, the shoulder 29 on the driving-piston stem 17 will strike against the service slide-valve 18 and so shift the latter as to bring its port 83 into alinement with the port 21, thus permitting the fluid-pressure from the auxiliary reservoir (which pressure passes into the chamber 11 through the passage 79 and port 80) to flow through the passage 24 and the pipe or passage 67 to the brake-piston cylinder, and thereby effect an ordinary or service application of the brakes. After the fluid-pressure has been applied to the brake-piston cylinder in the manner described the brakes are held applied by the same fluid-pressure from the auxiliary reservoir in the brake-piston cylinder. When it is desired to release the brakes, the pressure in the main train-pipe line is restored to a little above normal—that is, a little above seventy pounds pressure. This increase in pressure acting on the piston 8 retracts the main slide-valve 18, cutting off the passage of fluid-pressure from the automatic governor-valve, the main service-valve chamber, and the auxiliary reservoir to the brake-piston cylinder by closing the ports 21 and 22, and at the same time the exhaust-passage 26 is opened. This passage 26 is formed by a recess 25 in the bottom of the slide-valve 18, and it serves to connect the passage 24 (which communicates with the brake-piston cylinder) with the port 26, which leads to the atmosphere through passage $26^a$ and chambers, which will hereinafter be described. This permits the fluid-pressure to escape from the brake-piston cylinder. When, however, it is desirable to shut in or retain the fluid-pressure in the brake-piston cylinder which has passed to the brake-piston cylinder in the manner just described, it is customary to close what is known as a "retaining-valve," and heretofore it has been necessary to close this valve by hand, the valve being located in the body or upper portion of the car, where it can be reached by the brakeman.

One of the objects of my invention is to operate this retaining-valve automatically by fluid-pressure from any available source, preferably, however, from the main train-pipe in the manner herein described, and I accomplish this object by placing in connection with the exhaust a governor retaining-valve, which is also so connected with the main train-pipe or other source of supply as to be capable of being acted on by an excess of pressure above normal train-pipe pressure, which serves to close the exhaust-passage from the brake-piston cylinder to atmosphere. Leading from the passage 25 in the bottom of the main service slide-valve 18 is, as has already been mentioned, the port 26 and the exhaust-passage $26^a$. This passage $26^a$ is in open communication with the atmosphere excepting when the brakes are applied or when the automatic governor retaining-valve is closed. This retaining-valve is shown in Figs. $3^a$, 4, 6, and 9 and is connected with an automatic governor retaining device, (marked B.) The governor-valve B is similar in most of its parts to the governor-valve A, already described. In the body of the casting is formed a cylindrical valve-chamber 63, into which the exhaust-passage $26^a$ leads and from which chamber the exhaust-port 74 opens to atmosphere. In this chamber is a piston-valve 75, provided with suitable packing-rings 81 and adapted to make a tight joint between the piston and the side of the cylinder. Between the bottom of the chamber 63 and the piston 75 is a spiral spring 35, which normally holds the piston in an elevated position, leaving the passage through the chamber 63 from the passage $26^a$ to the exhaust-port 74 open. Leading from the valve-chamber 63 above the piston 75 is a fluid-passage 36, which extends into the flexible-diaphragm chamber 37 and is controlled by the governor pin-valve 39, which is connected with the disk hub 47 of the flexible diaphragm 38, as in the governor-valve A, already described. Leading into the flexible-diaphragm chamber is a fluid-passage 69, which communicates with the main train-pipe or other suitable source of supply of fluid-pressure. Above the disk hub of the flexible diaphragm and bearing thereon is the governor-spring 41, under sufficient tension to keep the pin-valve closed against a less pressure exerted on the flexible diaphragm than several pounds above the normal train-pressure of seventy pounds. When it is desirable to close the retaining-valve 75, the engineer increases the pressure in the main train-pipe to, say, seventy-five pounds, which pressure is sufficient to overcome the resistance of the governor-spring 41 and raise the pin-valve 39 from its seat 65 in the manner already described. This permits the fluid-pressure to pass from the flexible-diaphragm chamber into the passage 36, and thereby move the piston-valve 75 to its seat, which closes the exhaust-passage $26^a$ from atmosphere. When it is desirable to release the retaining-valve 75, the pressure in the main train-pipe or other source of supply is reduced to less than seventy-five pounds, whereupon the pin-valve 39 is seated, cutting off fluid-pressure above the valve 75, and the fluid in the passage 36 leaking through a vent-port the valve 75 is carried back to its normal position by the spring 35.

In descending a grade it is often desirable to have only a checking application of the brakes applied and yet at the same time to have this application maintained automatically. To this end I have provided an automatic governor-valve, which I have marked C in the drawings, to allow a flow of pressure fluid to the brake-piston cylinder and a second automatic governor-valve, which I have marked D, for cutting off such flow should the pressure exceed the degree desired. When these governor-valves are placed in operation, the exhaust-retaining valve 75 is kept closed by the automatic governor-valve B in the manner already described.

In order to make a checking application of the brakes, a service application is first made by a reduction of pressure in the main train-pipe, as already described. The retaining-valve 75 is then automatically closed by an increase of pressure from the main train-pipe or other sources. From a fluid-pressure chamber 91, which is formed in the body of the casting and is shown in Fig. 3, leads a passage 49, which extends to and communicates with the brake-piston cylinder, the purpose of this passage being to admit fluid-pressure from the main train-pipe to the brake-piston cylinder to make an application of the brakes without using the reserve fluid-pressure in the auxiliary reservoir.

Situated in the valve-chamber 53, which communicates with the chamber 91 through the port 50, is a retaining piston-valve 57, which valve is normally held against its seat by the spring 59, which bears at one end against the piston and at the opposite end against the wall of the valve-chamber. Communicating with the valve-chamber 52 and normally closed by the valve 57 is a port 58, which opens from the passage 36. This passage 36 communicates with the flexible-diaphragm chamber 37 of the governor-valve device, which I have designated by the letter C. The governor portion of this device is exactly the same as the governor portion of the valve A, excepting that in the governor C the flexible diaphragm 39 is adapted to be raised by an excess pressure above normal and above the pressure necessary to close the retaining governor-valve B. Extending from the diaphragm-chamber is the passage 56, which passage extends to a valve-chamber 55 of the second automatic governor-valve device, which is designated by the letter D. Leading to the valve-chamber 55 is a port 54, which communicates with the main train-pipe pressure or other source. (See Fig. 2.) Leading from the brake-piston cylinder is a passage 51, which extends to and opens into the flexible-diaphragm chamber 37 of the valve device D. The automatic governor devices of the valve D are exactly similar to the devices of the valve A, excepting that the flexible diaphragm is adapted to be raised at a checking fluid-pressure from the brake-piston cylinder, say, of twenty pounds.

As soon as the service application has been made from the auxiliary reservoir the back pressure from the brake-piston cylinder pressing against the piston-valve 57 opens the same and forms communication between the brake-piston cylinder and the automatic governor-valve C, and through C and the passage 56 with the automatic governor-valve device D.

The pressure from the brake-piston cylinder also passes through the passage 51 to the flexible-diaphragm chamber of the automatic governor-valve device D, (see Figs. 2, 3, and 4,) as already described, and so long as this pressure is above checking pressure—say of twenty pounds—it keeps the pin-valve 39 of D open and the port 54 closed, preventing any fluid-pressure from passing from the main train-pipe to the brake-piston cylinder through D and C. After the retaining-valve B has been closed and after the main train-pipe pressure has been restored to above normal, which shuts off communication between the main service-valve chamber and the brake-piston cylinder, the retaining-valve B is again opened by a slight reduction of pressure in the main train-pipe and the air is permitted to escape from the brake-piston cylinder until it is reduced to the desired checking application. The retaining-valve B is then again closed by an excess pressure in the main train-pipe or other source. In case this pressure in the brake-piston cylinder should be diminished by leakage or other causes to below, say, twenty pounds the pin-valve 39 of the automatic governor-valve device D closes, which permits the valve 61 to open from its seat 72 and the main train-pipe fluid-pressure—say of seventy-six pounds—to pass through the chamber 55 and the passage 56 to the flexible-diaphragm chamber of the automatic governor-valve device C, through the same, and through the passage 36 to the chamber 91, and thence through the passage 49 to the brake-cylinder. As soon as the pressure in the brake-piston cylinder is restored to above twenty pounds the pressure acting on the flexible diaphragm of the device D closes the valve of the same and shuts off fluid-pressure from C and the brake-cylinder.

It is often desirable in brake systems to apply a sudden and extreme emergency pressure to the brake-piston cylinder. In my improved system I employ devices by means of which this high pressure may be applied directly from the main train-pipe without affecting the fluid-pressure in the auxiliary reservoir.

Leading from the main train-pipe chamber 5 is a fluid-passage 90, which extends to the flexible-diaphragm chamber 37 of the automatic governor-valve device, which I have designated as E, the governor portion of which device is similar in all respects to the governor device C, excepting that the tension of the spring 41 is arranged to resist an extreme pressure, say, of eighty-five pounds. Leading from the flexible-diaphragm chamber 37 is a passage 36, which extends to the chamber 91, communication between this passage and the flexible-diaphragm chamber being normally closed by the pin-valve 39. Extending from this passage 90, as is already described, is the passage 49, which leads to the brake-piston cylinder.

When it is desired to apply an emergency pressure to the brakes, the engineer turns on a pressure of, say, eighty-five pounds in the main train-pipe. The first effect of this pressure is to close the retaining-valve 75, thereby closing the exhaust from the brake-piston cylinder after having closed the automatic governor-valve A in the manner already described, the air passing directly through the passage 69 to the flexible-diaphragm chamber of the automatic governor-valve B. This pressure also passes through the passage 90 to the flexible-diaphragm chamber of the automatic governor-valve E, and thence having raised the flexible diaphragm and valve 39 from its seat 65 it passes through the chamber 91 and passage 49 directly to the brake-piston cylinder, applying the brakes with an emergency pressure. By this operation the brakes may be applied and released repeatedly, the main service-valve being held in its normal position by the governor-valve A subject to a service or an emergency application of the brakes by a reduction of fluid-pressure in the main train-pipe to a point below the normal train-pipe pressure. As the speed of the train lessens under the emergency pressure it is desirable to have the pressure in the brake-piston cylinder correspondingly lessened to avoid undue pressure on the brakes. To this end I have provided a small vent-opening in the passage 36 of the automatic governor-valve mechanism D, through which the flexible-diaphragm chamber 37 of this governor-valve being in communication with the brake-piston cylinder, as already described, the air slowly leaks from the brake-piston cylinder, thus gradually reducing the pressure therein. This arrangement obviates entirely the use of what is known as "high-speed" valves and prevents skidding of the wheels.

In the use of the several automatic governor-valve mechanisms C, D, and E the valve 75, controlled by the automatic governor-valve B, must always be closed to close the exhaust from the brake-piston cylinder before air is allowed to pass from the main train-pipe through the several automatic governing devices to the brake-piston cylinder.

As already described, by means of the automatic governing devices C and D fluid-pressure from the main train-pipe can be added to the brake-piston cylinder to regulate the fluid-pressure therein at any time, and thereby the brake application may be perpetuated. Should the fluid-pressure in the brake-piston cylinder from the main train-pipe become higher than the pressure at which the automatic governor-spring 41 of the automatic governor device D is set, as already stated, the flexible-diaphragm valve will close and prevent any further flow of fluid-pressure from the main train-pipe chamber 5 into the several ports and passages leading to the brake-piston cylinder.

When is desired to obtain a quick-action high-pressure service or emergency application of the brakes, the fluid-pressure in the main train-pipe is reduced, say, to ten or fifteen pounds and opened to atmosphere, which will cause the piston 8 to be moved from its seat 76 by the fluid-pressure in the auxiliary reservoir, said piston traveling its full movement in the driving-piston cylinder. To prevent any shock or jar to the driving-piston or valve mechanism by this quick or sudden movement, a suitable buffing or regulating-stem mechanism is employed. This buffing mechanism consists of a stem 14, arranged in a suitable guide 4 in the chamber 5, where it is normally held in a forward position by the spring 15, so that its end will project through port 3 into the driving-piston cylinder 7. When the driving-piston 8 moves to the right, a knob or projection 16 on the driving-piston will strike against the regulating-stem 14, so that the spring 15 will take up the shock or jar. By this full movement of the driving-piston 8 and the service slide-valve 18, as already stated, an excess or high fluid-pressure of the brakes will be made by a full and free flow of all the fluid-pressure from the auxiliary reservoir, also of the normal train-pipe pressure, or greater, contained in the storage-chamber 89 and also from the main train-pipe, which train-pipe pressure will flow into the passage 24 from the auxiliary reservoir, the auxiliary reservoir being connected with the main train-pipe passage by the movement of the piston, which uncovers the port 88, leading into the storage-chamber 89 and passage 89$^D$, which passage 89$^D$ communicates with the main train-pipe passage 5. In this passage 89$^D$ is a cylindrical valve-chamber having a non-return check-valve 89$^a$, which is normally held to its seat 89$^B$ by a spring 89$^c$. The tension of the spring is adjusted to keep the valve seated. The purpose of this check-valve is to retain all fluid under pressure which passes through the said valve-chamber, and thereby prevent leakage from the auxiliary reservoir and brake-piston cylinder should a train be broken into sections, and it also retains the normal main train-pipe pressure, or greater, in the storage-chamber 89.

When there is an excess reduction of pressure in the main train-pipe, as already described, to allow air to pass from the auxiliary reservoir and the main train-pipe to the brake-piston cylinder through passage 89$^D$ and storage-chamber 89, the port 9 will be closed and fluid-pressure will pass from the auxiliary reservoir through the passages 79 and 80, the chamber 11, and the ports 82, 83, 84, 21, and 22 into the passage 24 and thence by the passage 67 into the brake-piston cylinder, making a high-pressure application of the brakes, as already described, adding the fluid under pressure from the storage-chamber 89 to the fluid-pressure in the brake-piston cylinder. Then follows train-pipe pressure through passage 89$^D$ and non-return valve 89$^a$, and this flow of fluid-pressure to the brake-piston cylinder will continue until the fluid-pressure in the brake-piston cylinder equals the fluid-pressure in the main train-pipe. The effect of an excess reduction of pressure in the main train-pipe is therefore to place the fluid under equal pressure at the same time in the main train-pipe, brake-piston cylinder, and auxiliary reservoir.

If at any time it is desirable to add fluid under pressure in the main train-pipe, even in ordinary service application of the brakes, to the fluid under pressure in the brake-piston cylinder, which has come from the auxiliary reservoir, in order to perpetuate such application of fluid under pressure from the main train-pipe, the fluid under pressure in the main train-pipe is increased to a little above normal—say to seventy-five or more pounds. The effect of this is to close the retaining-valve 75 by the action of the governor-valve B in the manner hereinbefore described. Then as soon as the pressure in the brake-piston cylinder becomes reduced from leakage or any other cause to, say, twenty pounds the automatic governor-valves C and D will admit a further supply from the main train-pipe to the brake-piston cylinder in the manner already described.

In Fig. 9 I have shown certain modifications in the construction and arrangement of the automatic governor-valve mechanism B. This modification is similar in construction to the mechanism already described, and shown in Figs. 5 and 6, and has its parts similarly numbered, excepting that the modification is provided with a valve 87, having a seat 98, adapted to close a port 99, which leads from the exhaust-chamber 63, and this valve is connected to a stem 91, carrying a piston 66, the valve being normally held away from its seat by the spring 97, which is interposed between the automatic-governor-retaining-valve piston 66 and the end of the piston-cylinder. Extending from this piston-cylinder is a bore 100 for the passage of the stem 91. The upper end of the cylinder 96 communicates by the passage 36 with the flexible-diaphragm chamber 37, the parts being similar to the parts of the flexible-diaphragm chambers hereinbefore described. In this modification the exhaust 74 from the brake-piston cylinder can be closed at any time by the application of an excess fluid under pressure from the main train-pipe or other source through the passage 69 to the flexible-diaphragm chamber 37, such excess pressure serving to raise the flexible diaphragm, open the pin-valve, and close the piston-valve 87, thereby cutting off communication between the brake-piston cylinder and the exhaust-port 74.

It is characteristic of my improved automatic valve mechanism that a service application of the brakes can be made by the use of only the fluid-pressure from the auxiliary reservoir, and during such service application the fluid under pressure in the main train-pipe can be added to the pressure in the brake-piston cylinder through the operation of the automatic-governor-valve mechanisms D and C in the manner already described. When the fluid under pressure in the main train-pipe is thus added to the fluid under pressure from the auxiliary reservoir, the fluid under pressure in the brake-piston cylinder cannot exceed the maximum fluid-pressure in the auxiliary reservoir, for the reason that as soon as the fluid under pressure in the brake-piston cylinder reaches such predetermined amount the automatic-governor-valve mechanism D is operated by back pressure from the brake-piston cylinder in the manner already described.

In describing the operations of the automatic-governor-valve mechanisms D and C reference was made to the piston-valve 57, which normally closes the passage 36, by which the chamber 91 is placed in communication with the automatic-governor-valve mechanisms C and D. The purpose of this cut-off valve is to enable an additional car to be coupled without setting the brakes, which is an unavoidable incident of such operations with the present systems, for as soon as the additional car is coupled to a train the reservoir and the passages in said car, being empty, draw fluid from the main train-pipe, and thereby cause a reduction of pressure in the same, which consequently makes a service application of the brakes to the cars having their auxiliary reservoirs filled with fluid-pressure. With the use of my system having the valve 57, however, this valve normally closes all communication between the main train-pipe through the automatic governor-valves D and C and the brake-piston cylinder, and this closure permits an excess pressure above normal train-pipe pressure, but below that required to operate the governor-valve E to be in the main train-pipe without applying the brakes, so that when the additional car is coupled this excess of fluid-pressure will fill the reservoir and passages of the additional car without reducing the pressure below normal train-pipe pressure—that is, without making such a reduction of pressure in the main train-pipe as would apply the brakes.

In Figs. 8 and 9 and 15 to 21, inclusive, I have illustrated certain modifications in the construction and arrangement of parts of my improved brake system—as, for example, in Fig. 8 the chamber 7 is connected to the chamber 11$^a$ by the by-pass 9, and the port 10 connecting one end of the valve-chest with the chamber 11$^a$. Also in lieu of arranging the automatic-governor-valve mechanism A immediately over the driving-piston cylinder-chamber 7, as shown in Fig. 1, this governor-valve mechanism may be so arranged that the governor-piston valve 31 thereof will control a port 12, which port is arranged between the chambers 11$^a$ and 13, with chamber 13 leading directly into the auxiliary reservoir. In this modification the service-slide-valve chamber 11 is provided with a slide-valve 18, which controls a part of the fluid under pressure to and from the brake-piston cylinder as follows: In Figs. 9 and 19 are shown a transverse port or passage 19, which is formed through the service slide-valve 18 and from which passage extends a port or passage 20, which in a certain position of the service slide-valve 18 will aline with the port 21 or 22. Another port 23, communicating with the valve-chamber, is so located that when the service slide-valve 18 is shifted to an excess or superior position it will register with the port 21, thus permitting fluid-pressure from the auxiliary reservoir to pass through the port 21 to the brake-piston cylinder by the passage 24. The under side of the service slide-valve 18 is recessed, as at 25, (shown in Figs. 2, 8, 10, 11, 12, 19, and 21,) so as to connect the port 21 with the exhaust-port 26 and passage 26$^a$ whenever the brakes are to be released. The flow of fluid under pressure from the auxiliary reservoir through the ports 19 and 21 is primarily controlled by a stem-valve 27, which, as shown in Figs. 8 and 20, is connected by a pin 28 on the driving-piston rod 17. By this construction the first movement of the driving-piston 8 will open the port 20; but fluid under pressure will not pass beyond the port 20 until after the service slide-valve 18 has been shifted by the striking of the head or shoulder on the inner end of the piston-rod against the inner end of the service slide-valve. When the service slide-valve 18 is to be shifted in the opposite direction, its movement is effected by the striking of the shoulder 30 on the piston-rod against the right-hand end of the valve or the end next to the driving-piston. It will be noticed that on the first movement of the driving-piston 8 to the right or toward the chamber 5 the valve 27 will be shifted prior to the movement of the main service slide-valve 18 and that when the piston 8 is restored to its normal position the valve 27 will close prior to the shifting of the said service slide-valve.

In the construction shown in Figs. 3 and 9, &c., the piston-valve cylinder 52 is arranged approximately parallel with the main multiple-power service-slide-valve chamber; but in the construction shown in Figs. 8 and 9 the chamber 52 is arranged approximately at right angles to the main-service-slide-valve chamber. As described in relation to Figs. 3 and 9, the passage 24 is connected by a port 50 with the valve chamber or cylinder 52, so as to shift the valve 57 to uncover the port 58, as hereinbefore described. This piston-valve 57 is provided with packing-rings 71, the purpose of which is to prevent the flow of fluid under pressure from the automatic governor-valve device C into the port 50 when the valve is seated. The automatic-governor-valve mechanisms A, B, C, D, and E are arranged and constructed as described in Figs. 2, 3, 6, &c., and are operative in the same manner. It will be observed by reference to Figs. 8 and 9 that the port 22, which is one of the excess-pressure ports, leads into a chamber 93, within which is arranged a non-return valve 94, which is normally held closed by a spring 95. The tension of this spring is so regulated that the valve can be forced down easily by fluid-pressure from the auxiliary reservoir, which passes through the port 22, and this valve will be returned by the spring 95 to a closed position as soon as the fluid under pressure in the brake-piston cylinder equals the fluid under pressure in the auxiliary reservoir. By this construction a free flow of air under pressure from the auxiliary reservoir through the port 22 to the passage 24 into the brake-piston cylinder is attained; but when exhausting from the brake-piston cylinder the non-return valve 94 will be closed and the whole exhaust must pass through a relatively small port 21, thus insuring a comparatively slow exhaust of air from the brake-piston cylinder to atmosphere through port 26 and passage $26^a$, exhaust-chamber 63, and port 74. This valve is especially useful in connection with the automatic-governor-retaining-valve mechanism B, as it prevents a great leakage of air from the brake-piston cylinder, as hereinbefore described.

I have used in the specification and claims the term "automatic governor-valve." By this term I include any device which will act as a governor either to retain, admit, or control fluid-pressure in the passages, for it will be clear to the skilled mechanic that other equivalent devices may be used in place of the flexible diaphragms, springs, and valves hereinbefore described—as, for instance, the same result may be obtained by the use of pressure-acting piston-valves in place of the flexible-diaphragm valves, the two being well-known equivalents, both governing the flow of fluid-pressures by differences of pressure on opposite sides of the piston or flexible diaphragm.

It is a further object of my invention to provide for a screw-plug to be inserted in the casting to compress the spring 35, as shown in Fig. 6, to any predetermined point of pressure desired, forcing the valve 75 to its uppermost position, so that the fluid under pressure may be regulated or governed to any predetermined point of pressure in the brake-piston cylinder, the valve 75 acting as a pressure-plate between two pressures—on the one side the governor-spring pressure and the fluid under pressure from the brake-piston cylinder, while on the opposite side fluid under pressure from the main train or brake pipe or any other source of supply.

It is a further object of my invention to provide for means in substituting a graduating slide-valve for the graduating pin-valve 27, as shown in Fig. 8 in connection with the main service slide-valve 18—that is, in substituting a graduating slide-valve for a graduating pin-valve 27. I would cut away all that body portion of the main service slide-valve 18 above a plane on a line of the lower side of the graduating pin-valve 27, so that a small graduating slide-valve would be reciprocated on the upper plane of the main service slide-valve 18 and under the piston-rod 17 and held in position between two small colors, each formed on the piston-rod 17 or other suitable means, at each end of the graduating slide-valve, so that at each reciprocation of the piston 8 the said graduating slide-valve would be shifted on its seat formed on the upper side of the main service slide-valve 18 and adapted to open and close port 20 in the slide-valve 18, through which port air-pressure would flow from the auxiliary reservoir and main-service-valve chamber into the brake-piston cylinder when the piston 8 had been shifted by reducing the fluid under pressure in the main train or brake pipe. Also a suitable spring would be fitted between the lower side of the piston-rod 17 and the upper side of the graduating slide-valve, adapted to hold the graduating slide-valve on its seat formed on the upper side of the main service slide-valve 18. This substitution is one being of greater refinement and positively closing port 20 and stopping the flow of fluid under pressure from flowing from the main-service-valve chamber and the auxiliary reservoir into the brake-piston cylinder when the driving-piston 8 is in what is termed a "lap" position and the fluid-pressure in the main train or brake pipe main-service-valve chamber and auxiliary reservoir are equal, and the fluid pressure in the brake-piston cylinder is less while a break application is being had.

By the foregoing description it will be understood that each movement of the driving-piston 8 will shift the graduating slide-valve—that is to say, when the fluid-pressure in the main train or brake pipe is reduced the graduating slide-valve is shifted in advance of the main service slide-valve 18 to open port 20 and when the fluid-pressure in the main train or brake pipe and main-service-valve chamber and auxiliary reservoir are equal the graduating slide-valve would be shifted by the piston 8 on the main service slide-valve 18 to close port 20.

It is a further object of my invention, among other things, to provide for a retaining-valve feed-valve with a greater refinement than shown in my Letters Patent, dated April 18, 1905, Serial No. 238,733, by having a slide-valve device with two ports through it. The port in said slide-valve nearest to the supply end of the retaining-valve feed-valve chamber is the feed and exhaust port, which will admit the pressure from the train-pipe through a feed-port in the slide-valve seat in the bushing into and through a feed and exhaust passage, thence into a feed and exhaust cavity on the under side of the main service slide-valve, leading into a feed and exhaust passage communicating with the brake-cylinder when the retaining-valve feed-valve is in its retaining and feeding position, said port so adapted to admit a part of the exhaust from the brake-cylinder into the retaining-valve feed-valve chamber, thence through another port in the retaining-valve feed-valve seat in the bushing to atmosphere after the retaining-valve feed-valve has been shifted to an exhaust position, a second port in the slide-valve adapted to exhaust a portion of the air from the brake-cylinder into the retaining-valve feed-valve chamber, which then flows through the first port mentioned to atmosphere.

It is a further object of my invention to provide for an always-open port in the retaining-valve feed-valve chamber opening into a passage leading to the feed and exhaust port in the main-service-valve bushing. In said passage a check-valve is inserted, adapted to cut off the flow of pressure from said retaining-valve feed-valve chamber to the brake-cylinder when the retaining-valve feed-valve is closed, but adapted to open and admit a portion of the exhaust-air from the brake-cylinder into the retaining-valve feed-valve chamber when the retaining-valve feed-valve is shifted to an exhaust position or when the brakes are to be released.

It is a further object of my invention to provide for a non-return check-valve, which is inserted in the feed-passage leading from the retaining-valve feed-valve feed-port in the seat of the retaining-valve feed-valve slide-valve for the purpose of admitting pressure from the train-pipe into the brake-cylinder after said pressure flows into the retaining-valve feed-valve chamber, but not to admit any pressure from the brake-cylinder into the retaining-valve feed-valve chamber when the brakes are released.

It is a further object of my invention to provide for the face of the casting forming the retaining-valve feed-valve piston-cylinder to be flanged and planed similar to the face of the casting forming the main-service-valve piston-cylinder 7, the purpose of which is to attach a planed casting formed similar to the casing that forms the chamber 5 in Fig. 2, in which the stem 14 is operated, substituting for the buffer-stem 14 a lever-piston operating in a piston-cylinder adapted to move by pressure horizontally with the retaining-valve feed-valve piston and in opposite direction to its inner face or pressure side, a fulcrum being formed adapted to accept one end of a lever and pinned thereto in a suitable manner, so that it will have a hinge movement. The other end of said lever is attached to a second lever, (which is axeled on a pin passing through the casting.) The second lever referred to is formed so that the opposite end to which it is attached will stop the travel of the retaining-valve feed-valve device when pressure in the retaining-valve feed-valve chamber on the brake-cylinder or slide-valve side of the retaining-valve feed-valve piston is greater than desired by leaking past the said piston, as the stopping of the retaining-valve feed-valve device at a certain point of travel in its chamber will cut off all communication leading to the brake-cylinder, regardless of the pressure in the retaining-valve feed-valve chamber above that pressure desired. The piston and lever device will also prevent the retaining-valve feed-valve from exhausting any pressure from the brake-cylinder until the pressure from the train-pipe has been cut off from the train-pipe side of the retaining-valve feed-valve piston. A spring is interposed between the opposite side of the lever-piston and the opposite end of the lever-piston cylinder adapted to shift the piston when the pressure is exhausted in the chamber of the retaining-valve feed-valve apparatus. Also the chamber containing the above-named spring is vented to atmosphere. Also ports leading to atmosphere are provided for the escape of any pressure that may leak into the retaining-valve feed-valve chamber when the retaining-valve feed-valve is open. Said ports are closed automatically when the retaining-valve feed-valve is closed.

It is a further object of my invention to provide for a suitable valve, which being formed in the triple-valve body and operated on each car for the purpose of admitting pressure from the train-pipe into the brake-cylinder on each car through the retaining-valve feed-valve apparatus after the main-service slide-valve has been shifted to an exhaust position to save the train from drifting while descending long heavy grades and while the auxiliary reservoir on each car is being recharged to the normal train-pipe pressure; said valve also adapted to exhaust the pressure from the brake-cylinder on each car when operated for the purpose of releasing the brake on each car, or if the fluid-pressure in the main train or brake pipe is increased the graduating slide-valve would be shifted in advance of the main-service slide-valve 18.

It is a further object of my invention to provide for a duplex automatic governor-retaining valve feed-valve device to be substituted for the retaining-valve device, as shown in Fig. 6, by producing or securing a piston-rod to the automatic governor-retaining-valve piston 75, similar to the piston-rod 17 in connection with the main-service slide-valve device, also a slide-valve similar to the main-service slide-valve, the same fitted in a chamber similar to the main-service-valve chamber and formed in any position in the main casting or connected therewith, said chamber to have a passage leading to the brake-piston cylinder and also a passage leading to atmosphere known as the "exhaust-passage" through said chamber leading from the brake-piston cylinder to atmosphere. The retaining-valve piston is fitted in a chamber similar to the main-service-valve piston-cylinder 7, with a feed-groove in the chamber similar to groove or port 9 to admit fluid into the brake-piston cylinder when the piston has compressed a governor-spring sufficiently enough to open a passage through said groove or port from the main train or brake pipe to the brake-piston cylinder after the automatic governor-valve device B has been operated by an excess fluid-pressure that would exist in the main train or brake pipe. The slide-valve referred to would be reciprocated on a flat seat similar to the seat $70^a$ in the main-service-valve chamber to close and open an exhaust-port through said seat, the piston-chamber would be tightly inclosed with a passage leading to the governor device B with only a very small vent-port, in the opposite end of said retaining-valve chamber would be a screw-plug inserted in the casting, and a coiled governor-spring would be interposed at the one end by said screw-plug, while at the other end by the piston-rod of the retaining-valve piston the governor-spring would be set at a certain predetermined point of pressure, holding the slide-valve with an open exhaust, and to govern the fluid under pressure in the brake-piston cylinder, colors would be formed on the piston-rod or other suitable means adapted to shift the said slide-valve to close and open the exhaust-port. The cavity on the under side of the main-service slide-valve 18 would form a passage for the flow of air into the brake-piston cylinder, as well as to exhaust the air from the brake-piston cylinder. The means secured to the piston-rod would be located so that the piston would reciprocate between the fluid-pressure in the brake-piston cylinder and the governor-spring on one side and the fluid-pressure from the main train or brake pipe on the other side without shifting the slide-valve—that is, so that fluid-pressure would be admitted into the brake-piston cylinder and the same cut off from the brake-piston cylinder without shifting said slide-valve.

I also do not desire to limit myself to the specific construction and arrangement of parts which I have employed, my purpose being to describe fully and clearly an automatic operative mechanism which, however, may be modified in many ways by the skilled mechanic.

I claim—

1. In an automatic fluid-pressure brake system, the combination of a brake-piston cylinder, an auxiliary reservoir, a main train or brake pipe, and a main service-valve, passages between the said parts, an automatic operative governor means for governing the fluid under pressure in the main service-valve chamber and auxiliary reservoir, with an always-open passage between the main-service-valve piston and the auxiliary reservoir, governed so the fluid under pressure in the main-service-valve chamber is less than that in the main train or brake pipe, substantially as set forth.

2. In an automatic fluid-pressure brake system, the combination of a brake-piston cylinder, an auxiliary reservoir, a main train or brake pipe, and a main service-valve, with a device for so controlling the fluid-pressure in the main-service-valve chamber as to enable the production and reduction of an excess fluid-pressure above normal train-pipe pressure in the train-pipe passages without operating the main service-valve.

3. In an automatic fluid-pressure brake system, the combination of a brake-piston cylinder, an auxiliary reservoir, a main train or brake pipe, and a main service-valve, with automatic governor devices for closing the exhaust-passage leading from the brake-piston cylinder to the atmosphere, when an excess fluid under pressure in the main train or brake pipe operates means to govern the fluid-pressure in the main-service-valve chamber, substantially as set forth.

4. In an automatic fluid-pressure brake system, the combination of a brake-piston cylinder, an auxiliary reservoir, a main train or brake pipe, main train-pipe passages and a main service-valve, with an automatic governor-valve adapted to be operated by normal or excess fluid-pressure and to maintain a predetermined fluid-pressure, at or above normal train-pipe pressure, in the train-pipe passages, substantially as set forth.

5. In an automatic fluid-pressure brake system, the combination of a brake-piston cylinder, an auxiliary reservoir, a main train or brake pipe, and a main service-valve, an automatic governor-valve adapted to be operated by an excess of fluid-pressure above the normal and adapted to close the exhaust-passage leading from the brake-piston cylinder, a governor device adapted to govern the fluid-pressure in the auxiliary reservoir and main-service-valve chamber with open passages between the open face of the driving-piston and auxiliary reservoir, substantially as set forth.

6. In an automatic fluid-pressure brake system, the combination of a brake-piston cylinder, an auxiliary reservoir, a main train-pipe, passages between the said parts, an automatic governing means for maintaining a predetermined fluid-pressure in the auxiliary reservoir, and a passage between the auxiliary reservoir and said governing means, whereby the governor is operated by back pressure from the auxiliary reservoir, substantially as set forth.

7. In an automatic fluid-pressure brake system, the combination of a brake-piston cylinder, an auxiliary reservoir, a main train or brake pipe, and a main service-valve, with an automatic governor-valve having an always-open passage between the main-service-valve chamber and said governor-valve chamber, adapted to be operated by an excess of fluid-pressure in the main train or brake pipe above the normal, a passage leading from the main train or brake pipe to valve means to close the exhaust-passage leading from the brake-piston cylinder to the atmosphere, after means have cut off the excess pressure in the main train or brake pipe from flowing into the main-service-valve chamber, governing that quantity of fluid therein, substantially as set forth.

8. In an automatic fluid-pressure brake system, the combination of a brake-piston cylinder, an auxiliary reservoir, a main train or brake pipe and a main service-valve, with an automatic governing device for controlling the fluid-pressure in the main service-valve, and an automatic governing device for admitting an excess fluid-pressure above normal train-pipe pressure, to the brake-piston cylinder, substantially as set forth.

9. In an automatic fluid-pressure brake system, the combination of a brake-piston cylinder, an auxiliary reservoir, a main train-pipe, passages between the said parts, an automatic governing means for maintaining a predetermined pressure in the brake-piston cylinder, and a passage or opening between the brake-piston cylinder and the said governing device, whereby the governing device is actuated by back pressure from the brake-piston cylinder, substantially as set forth.

10. In an automatic fluid-pressure brake system, the combination of a brake-piston cylinder, an auxiliary reservoir, a main train-pipe, passages between the said parts, an automatic governing means adapted to regulate the pressure in the brake-piston cylinder to a predetermined amount, a passage connecting said governing means with the main train-pipe and with the brake-piston cylinder, an automatic governing means located in said passage for admitting a predetermined pressure to the brake-piston cylinder, an automatic governing means for admitting a greater predetermined fluid-pressure from the main train-pipe into the brake-piston cylinder, a passage or opening leading from the main train-pipe to said governing device and from said governing device to the brake-piston cylinder, substantially as set forth.

11. In an automatic fluid-pressure brake system, the combination of a brake-piston cylinder, an auxiliary reservoir, a main train-pipe, passages between the said parts, an automatic governing means for admitting a predetermined pressure to the brake-piston cylinder, a passage between the said governing device and the brake-piston cylinder, a check-valve adapted to normally close said passage so that when the pressure is reduced in the main train-pipe of the car by coupling this pipe to an uncharged pipe of a rear car the check-valve which closes the passage to the brake-piston cylinder will prevent a brake application, substantially as set forth.

12. In an automatic fluid-pressure brake system, the combination of a brake-piston cylinder, an auxiliary reservoir, a main train or brake pipe, a main service-valve adapted to be operated by difference of pressure between the main train-pipe and the auxiliary reservoir, a brake-piston cylinder, passages leading from the main service-valve to the brake-piston cylinder, a passage leading from the main train or brake pipe through an automatic governor device to the main service-valve and the auxiliary reservoir, said passages being controlled by the automatic governor device and the main service-valve, an uncontrolled passage leading from the auxiliary reservoir to the main-service-valve chamber, whereby under reduction of pressure in the main train-pipe the main service-valve will be operated and the fluid-pressure will be allowed to pass from the main train-pipe to the auxiliary reservoir and thence to the brake-piston cylinder, substantially as set forth.

13. In an automatic fluid-pressure brake system, the combination of an auxiliary reservoir, an automatic governor-valve for controlling the pressure in the main-service-valve chamber, a main train-pipe, a main service-valve, a passage or opening leading from the main train-pipe to one surface of the main service-valve, an uncontrolled passage or opening leading from the auxiliary reservoir to the other surface of the main service-valve, a brake-piston cylinder, and a passage leading from the valve to the brake-piston cylinder, substantially as set forth.

14. In an automatic fluid-pressure brake system, the combination of a brake-piston cylinder, an auxiliary reservoir, a main service-valve, a main train-pipe, connections between the brake-piston cylinder and the main train-pipe, and operative means for maintaining in the main-service-valve chamber a predetermined fluid-pressure equal to or less than the fluid-pressure in the main train-pipe, substantially as set forth.

15. In an automatic fluid-pressure brake system, the combination of a brake-piston cylinder, an auxiliary reservoir, a main service-valve, a main train-pipe, connections between the brake-piston cylinder, the auxiliary reservoir, and the main train-pipe, governor-valve mechanism adapted to be operated by an excess fluid-pressure from the main train-pipe, the purpose of which governor-valve mechanism is to control the flow of fluid-pressure in the main train-pipe passages as it passes to the brake-piston cylinder, substantially as set forth.

16. In an automatic fluid-pressure brake system, the combination of a brake-piston cylinder, an auxiliary reservoir, a main train-pipe, connections between the auxiliary reservoir the brake-piston cylinder and the main train-pipe, a governor-valve mechanism adapted to be operated by fluid-pressure from the main train-pipe, the purpose of this valve being to control the flow of fluid-pressure from the main train-pipe passages into the brake-piston cylinder, and a governor-valve mechanism adapted to be operated by back pressure from the brake-piston cylinder, said governor-valve controlling the flow of fluid-pressure from the main train-pipe into the brake-piston cylinder, substantially as set forth.

17. In an automatic fluid-pressure brake system, the combination of a brake-piston cylinder, an auxiliary reservoir, a main train or brake pipe, and a main service-valve, which controls the flow of fluid-pressure from the auxiliary reservoir to the brake-piston cylinder and exhaust therefrom, the controlling of the fluid from auxiliary reservoir to the brake-piston cylinder is being done only when the automatic governor-valve is open that governs the fluid-pressure in the main service-valve chamber and auxiliary reservoir, the exhaust-passage adapted to exhaust from the brake-piston cylinder to the atmosphere at a normal application of the brakes or after the excess pressure in the main train or brake pipe has been reduced, such reduction opening the retaining-valve mechanism, substantially as set forth.

18. In an automatic fluid-pressure brake system, the combination of a brake-piston cylinder, an auxiliary reservoir, a main train-pipe, passages between the brake-piston cylinder and the main train-pipe, a normally opened governor-valve interposed between the main train-pipe and the main service-valve, and means adapted to be so operated by fluid-pressure from the main train-pipe as to close the said governor-valve whenever the fluid-pressure in the main service-valve chamber reaches a predetermined point or to the normal fluid-pressure in the main train-pipe, substantially as set forth.

19. In an automatic fluid-pressure brake system, the combination of a brake-piston cylinder, an auxiliary reservoir, a main train-pipe, passages from the brake-piston cylinder to the main train-pipe, a normally opened governor-valve arranged in such connections, and means adapted to be so operated by fluid-pressure in the brake-piston cylinder as to close the said governor-valve in order to maintain a certain predetermined fluid-pressure in the brake-piston cylinder, substantially as set forth.

20. In an automatic fluid-pressure brake system, the combination of a brake-piston cylinder, an auxiliary reservoir, a main train-pipe, passages between the auxiliary reservoir and the main train-pipe, passages between the brake-piston cylinder and the main train-pipe, governor-valves arranged in the passages between the brake-piston cylinder and the main train-pipe, means adapted to be so operated by fluid-pressure from the auxiliary reservoir as to close one of said governors, and means adapted to be so operated by fluid-pressure from the main train-pipe as to open the other governor-valve, substantially as set forth.

21. In an automatic fluid-pressure brake system, the combination of a brake-piston cylinder, an auxiliary reservoir, a main train-pipe, a main service-valve adapted to be so operated by fluid-pressure from the main train-pipe as to control the flow of fluid to the brake-piston cylinder at a service application, a governor adapted to maintain the pressure in the main service-valve chamber at normal train-pipe pressure, a normally opened exhaust-governor valve, means adapted to be so operated by an excess fluid-pressure in the main train-pipe as to close the said governor-valve and thereby retain fluid-pressure in the brake-piston cylinder, thus perpetuating an application of the brakes while the auxiliary reservoir is being charged with fluid-pressure from the main train-pipe and until such excess pressure in the main train-pipe is reduced below a predetermined point, substantially as set forth.

22. In an automatic fluid-pressure brake system, the combination of a brake-piston cylinder, an auxiliary reservoir, a main train-pipe, independent passages and ports connecting the auxiliary reservoir to the brake-piston cylinder, independent passages connecting the brake-piston cylinder to the main train-pipe, a main service-valve in communication at all times with the auxiliary reservoir to enable an emergency application to be made adapted to be so operated by reduction of fluid-pressure in the main train-pipe as to open said ports and thereby simultaneously connect the brake-piston cylinder with the auxiliary reservoir and with the main train-pipe, substantially as set forth.

23. In an automatic fluid-pressure brake system, the combination of a brake-piston cylinder, an auxiliary reservoir, a main train-pipe, a valve-chamber having ports connected with the brake-piston cylinder, a valve arranged in said chamber and controlling the fluid-pressure through the said ports, a cylinder and piston arranged in said valve-chamber, a piston-rod extending into the said valve-chamber, the said piston-rod being so provided with valves as to form a chamber between them and also to close the inner end of the chamber against fluid-pressure from the auxiliary reservoir, ports which lead to the brake-piston cylinder and main train-pipe, a main train-pipe port, passages between this port and the main train-pipe, the port being adapted to be so uncovered by the valves as to admit fluid-pressure from the main train-pipe into the valve-chamber, into the auxiliary reservoir, and into the brake-piston cylinder, substantially as set forth.

24. In an automatic fluid-pressure brake system, the combination of a brake-piston cylinder, an auxiliary reservoir, a main train-pipe, a main service-valve adapted to control the flow of fluid-pressure from the auxiliary reservoir to the brake-piston cylinder, an uncontrolled passage between the auxiliary reservoir and the main service-valve chamber to enable an emergency application to be made a port and passage connecting auxiliary reservoir with the main train-pipe, connections with the brake-piston cylinder, means operative with the main service-valve to uncover said port and to open said passages by excess reduction of fluid-pressure in the main train-pipe, thereby admitting fluid-pressure from the main train-pipe to the auxiliary reservoir and to the brake-piston cylinder, substantially as set forth.

25. In an automatic fluid-pressure brake system, the combination of a brake-piston cylinder, an auxiliary reservoir, a main train-pipe, a main service-valve passages between the main train-pipe and the brake-piston cylinder, a governor-valve disconnected from and independent of the main service-valve held normally closed and adapted to control said passages, said governor-valve being adapted to be so operated or opened by excess fluid-pressure from the main train-pipe as to admit fluid-pressure from the main train-pipe into the brake-piston cylinder, substantially as set forth.

26. In an automatic fluid-pressure brake system, the combination of a brake-piston cylinder, an auxiliary reservoir, an automatic governor-valve for regulating the pressure in the main service-valve chamber, a main train-pipe, a main service-valve adapted to control the flow of fluid-pressure from the auxiliary reservoir and also to control part of the fluid-pressure from the main train-pipe as these pressures pass to the brake-piston cylinder, substantially as set forth.

27. In an automatic fluid-pressure brake system, the combination of a brake-piston cylinder, an auxiliary reservoir, a main train-pipe, an open-end cylindrical valve-chamber, ports in said chamber communicating with the main train-pipe passage, with the brake-piston cylinder, and with the auxiliary reservoir, a main service-valve controlling the fluid-pressure through the ports in the valve-chamber that lead to the brake-piston cylinder from the auxiliary reservoir and from the main train-pipe, a main service-valve stem provided with valves normally closing port and passage communication with the main train-pipe, substantially as set forth.

28. In an automatic fluid-pressure brake system, the combination of a brake-piston cylinder, an auxiliary reservoir, an automatic governor-valve, a main train-pipe for fluid-pressure, passages between the auxiliary reservoir and the main train-pipe, a main service-valve piston adapted to cut off the fluid-pressure which passes from the main train-pipe through the governor-valve to the main service-valve chamber, upon reduction of fluid-pressure in the main train-pipe, substantially as set forth.

29. In an automatic fluid-pressure brake system, the combination of a brake-piston cylinder, an auxiliary reservoir, a governor-valve, a main train-pipe, a normally open passage from the main train-pipe to the auxiliary reservoir, a normally closed by-pass connection between the main train-pipe, the auxiliary reservoir, and the brake-piston cylinder, a main service-valve adapted, on the reduction of fluid-pressure in the main train-pipe, to close the normally open passage between the governor-valve and the auxiliary reservoir and the main train-pipe, and to open the by-pass whereby a perpetuation of fluid-pressure from the main train-pipe into the auxiliary reservoir and into the brake-piston cylinder can be maintained, substantially as set forth.

30. In an automatic fluid-pressure brake system, the combination of a brake-piston cylinder, an auxiliary reservoir, a main train-pipe, passages between these parts, an automatic governor-valve so held as to normally govern or regulate the fluid-pressure in the main train-pipe passage which leads from the main train-pipe and enters the auxiliary reservoir, and an automatic governor-valve adapted to admit the fluid-pressure from the main train-pipe to the brake-piston cylinder, regardless of the fluid-pressure in the auxiliary reservoir and the brake-piston cylinder, substantially as set forth.

31. In an automatic fluid-pressure brake system, the combination of a brake-piston cylinder, an auxiliary reservoir, a main train-pipe, passages between the said parts, a main service-valve controlling the passage between the auxiliary reservoir and the brake-piston cylinder and operative by a reduction of fluid-pressure in the main train-pipe or when the fluid-pressure in the auxiliary reservoir exceeds the fluid-pressure in the main train-pipe, an automatic governor-valve operative or opened on increase of fluid-pressure in the main train-pipe to permit the flow of fluid-pressure in the main train-pipe into the brake-piston cylinder without decreasing the fluid-pressure in the auxiliary reservoir, substantially as set forth.

32. In an automatic fluid-pressure brake system, the combination of a brake-piston cylinder, an auxiliary reservoir, a main train-pipe, having independent passages to the auxiliary reservoir and brake-piston cylinder, an automatic governor-valve operative or opened by fluid-pressure in the main train-pipe and controlling such passages to charge the brake-piston cylinder and the auxiliary reservoir with fluid-pressure from the main train-pipe at the same time, substantially as set forth.

33. In an automatic fluid-pressure brake system, the combination of a brake-piston cylinder, an auxiliary reservoir, a main train-pipe, a main service-valve controlling the flow of fluid-pressure from the auxiliary reservoir to the brake-piston cylinder, and an automatic governor-valve admitting excess fluid-pressure into the brake-piston cylinder from the main train-pipe without shifting the main service-valve, which controls the flow of fluid-pressure from the auxiliary reservoir to the brake-piston cylinder, substantially as set forth.

34. In an automatic fluid-pressure brake system, the combination of a brake-piston cylinder, an auxiliary reservoir, a main train-pipe, a main service-valve for admitting fluid-pressure into the brake-piston cylinder from the auxiliary reservoir when said fluid-pressure exceeds that of the fluid-pressure in the main train-pipe, and from the main train-pipe to the brake-piston cylinder; an automatic governor-retaining valve, opening when affected by excess fluid-pressure and closing the exhaust, thus shutting in the fluid-pressure in the brake-piston cylinder any length of time desired, and an automatic governor-valve admitting the flow of fluid-pressure from the main train-pipe to the brake-piston cylinder, said governor-valve being operative on increase of fluid-pressure in the main train-pipe, substantially as set forth.

35. In an automatic fluid-pressure brake system, the combination of a brake-piston cylinder, an auxiliary reservoir, a main service-valve a main train-pipe, passages between these parts, a governor-valve for closing communication between the main train-pipe and the main service-valve, a normally opened automatic fluid-pressure-retaining governor-valve controlling the flow of fluid-pressure through the exhaust-passages from the brake-piston cylinder to atmosphere, said governor-valves being operative on an increase of fluid-pressure above normal train-pipe pressure, substantially as set forth.

36. In an automatic fluid-pressure brake system, the combination of a brake-piston cylinder, an auxiliary reservoir, a main train-pipe, passages between these parts, a main service-valve operative on the reduction of fluid-pressure in the main train-pipe to permit the flow of fluid-pressure from the auxiliary reservoir to the brake-piston cylinder, an automatic fluid-pressure governor-retaining valve, and an automatic governor-valve controlling the flow of fluid-pressure from the main train-pipe to the brake-piston cylinder, two of said valves being operative on the increase and decrease of fluid-pressure, substantially as set forth.

37. In an automatic fluid-pressure brake system, the combination of a brake-piston cylinder, an auxiliary reservoir, a main train or brake pipe and a main service-valve, an automatic governor-valve adapted to close the exhaust, an automatic governor-valve adapted to close communication between the main train-pipe and the main-service-valve chamber, and an automatic governor-valve adapted to change the fluid-pressure in the brake-piston cylinder at the will of the engineer, and without moving the main service-valve, substantially as set forth.

38. In an automatic fluid-pressure brake system, the combination of a brake-piston cylinder, a main service-valve, an auxiliary reservoir, a main train-pipe, and means adapted to charge the brake-piston cylinder without decreasing the fluid-pressure in the auxiliary reservoir, substantially as set forth.

39. In an automatic fluid-pressure brake system, the combination of a brake-piston cylinder, a main service-valve, an auxiliary reservoir, a main train-pipe, passages between these parts, means adapted to charge the auxiliary reservoir and brake-piston cylinder at the same time before or after a brake application, substantially as set forth.

40. In an automatic fluid-pressure brake system, the combination of a brake-piston cylinder, a main service-valve, an auxiliary reservoir, a main train-pipe, means adapted to admit fluid-pressure from the main train-pipe into the brake-piston cylinder after the main service-valve has been driven to its seat without affecting the normal condition of said valve, substantially as set forth.

41. In an automatic fluid-pressure brake system, the combination of a brake-piston cylinder, a main service-valve, an auxiliary reservoir, a main train-pipe, passages between these parts, operative means for admitting a greater fluid-pressure from the auxiliary reservoir into the brake-piston cylinder, a supplemental exhaust-passage from the brake-piston cylinder to atmosphere, devices for closing the supplemental exhaust-passage, and an automatic governor-retaining valve located in the exhaust-passage and adapted to be operated by an excess pressure, substantially as set forth.

42. In an automatic fluid-pressure brake system, the combination of a brake-piston cylinder, a main service-valve, an auxiliary reservoir, a main train-pipe, an automatic governor-retaining valve adapted to close the exhaust-passage by fluid-pressure from the main train-pipe moving the governor-retaining-valve mechanism to its seat before charging the brake-piston cylinder with fluid-pressure, and an automatic governor-valve for admitting fluid-pressure from the main train-pipe to the brake-piston cylinder, whereby an application of the brakes is made from excess fluid-pressure in the main train-pipe, substantially as set forth.

43. In an automatic fluid-pressure brake system, the combination of a brake-piston cylinder, an auxiliary reservoir, a main service-valve, a main train-pipe, an automatic governor-valve having means adapted to close the exhaust, and an automatic governor-valve adapted to increase the fluid-pressure in the brake-piston cylinder from the main train-pipe, after an application has already been made, without affecting the normal conditions of the main service-valve, substantially as set forth.

44. In an automatic fluid-pressure brake system, the combination of a brake-piston cylinder, a main service-valve, an auxiliary reservoir, a main train-pipe an automatic governor-valve adapted to make a straight fluid application of the brakes by excess fluid-pressure in the main train-pipe and an automatic governor-valve adapted to keep the fluid-pressure in the auxiliary reservoir as a reserve-pressure to the amount of the normal fluid-pressure in the main train-pipe, substantially as set forth.

45. In an automatic fluid-pressure brake system, the combination of a brake-piston cylinder, an auxiliary reservoir, a main train-pipe, a main service-valve, an automatic governor-valve communicating with the main-train-pipe passages leading to the auxiliary reservoir, the inlet-port of said governor-valve device communicating with the auxiliary reservoir and with the passages from the main train-pipe thereto, so that the governor-valve device regulates or governs the fluid-pressure in the auxiliary reservoir and main-service-valve chamber to a predetermined fluid-pressure, substantially as set forth.

46. In an automatic fluid-pressure brake system, the combination of a brake-piston cylinder, an auxiliary reservoir, a main service-valve, a main train-pipe, an automatic governor or regulating valve fitted with a flexible diaphram and piston, means connected and placed in different-sized cylinders parallel with each other, one piston being larger than the other one, so that a less or equal pressure of air through the flexible diaphragm-chamber, charging the first piston, will permit the valve mechanism to be closed against the equal to or greater pressure of air opposing the travel of the other piston, which is connected to the valve member of the valve mechanism, substantially as set forth.

47. In an automatic fluid-pressure brake system, the combination of a brake-piston cylinder, an auxiliary reservoir, a main train or brake pipe, a main service-valve, an automatic governor-retaining-valve device, independent of the auxiliary reservoir, adapted to retain the fluid-pressure in the brake-piston cylinder perpetuating an application of the brakes only when an excess of pressure exists in the main train or brake pipe, and an automatic governor device adapted to cut off such excess pressure from flowing into the main-service-valve chamber and auxiliary reservoir, and adapted to govern the fluid-pressure in said chamber and reservoir, after the main service-valve device has been shifted to a released position, substantially as set forth.

48. In an automatic fluid-pressure brake system, the combination of a brake-piston cylinder, a main service-valve, an auxiliary reservoir, a main train-pipe, an automatic governor-valve having operative means to charge the brake-piston cylinder with fluid-pressure and make an application of the brakes without closing the exhaust-passage therefrom through the main service-valve, substantially as set forth.

49. In an automatic fluid-pressure brake system, the combination of a brake-piston cylinder, an auxiliary reservoir, a main train-pipe, a valve and flexible diaphragm, a diaphragm-chamber adapted to be charged with excess fluid-pressure from the main train-pipe, thereby opening communication between the main train-pipe and the valve-seat port, substantially as set forth.

50. In an automatic fluid-pressure brake system, the combination of a brake-piston cylinder, a main service-valve, an auxiliary reservoir, a main train-pipe, an automatic governor-valve operative by back fluid-pressure from the brake-piston cylinder and adapted to govern or regulate the supply of fluid-pressure to the brake-piston cylinder, substantially as set forth.

51. In an automatic fluid-pressure brake system, the combination of a brake-piston cylinder, an auxiliary reservoir, a main train-pipe, a main service-valve provided with a piston device moving in two different-sized cylinders parallel with each other, both pistons being shifted by fluid-pressure in the main train-pipe and also by fluid-pressure in the auxiliary reservoir, the pistons being employed to uncover ports communicating with the fluid-pressure in the auxiliary reservoir and pressure from the main train-pipe to the brake-piston cylinder, substantially as set forth.

52. In an automatic fluid-pressure brake system, the combination of a brake-piston cylinder, an auxiliary reservoir, a main train-pipe, an automatic governor-retaining valve, operative means in a main service-valve for admitting fluid-pressure into the brake-piston cylinder and to the exhaust-retaining valve-chamber, said means being movable between pistons, (both of which pistons are subject to pressure) moving in different-sized cylinders on opposite ends of the piston-stem, substantially as set forth.

53. In an automatic fluid-pressure brake system, the combination of a brake-piston cylinder, an auxiliary reservoir, a main train-pipe, a main service-valve provided with a valve-bushing, the outer end being formed by having a plane on the lower inner side provided with ports therein for the passage of fluid-pressure from the auxiliary reservoir, from the main train-pipe, from the exhaust, and from the brake-piston cylinder, said plane being also for the travel of the valve device, while the inner open end of the bushing forms a perfect cylinder-casing, said pistons being carried on the driving-piston stem, the inner end or piston-cylinder being fitted with ports for admitting fluid-pressure from the main train-pipe through by-passes into the auxiliary reservoir and into the brake-piston cylinder, thus making a brake application, substantially as set forth.

54. In an automatic fluid-pressure brake system, the combination of a brake-piston cylinder, an auxiliary reservoir, a main train-pipe, an automatic governor-valve, means to charge both the auxiliary reservoir and brake piston-cylinder with fluid-pressure from the main train-pipe at the same time without affecting the main-service-valve device, substantially as set forth.

55. In an automatic fluid-pressure brake system, the combination of a brake-piston cylinder, an auxiliary reservoir, a main train or brake pipe and a main service-valve, and means for filling the reservoir and passages of an additional car without affecting or operating the said main service-valve, substantially as set forth.

56. In an automatic fluid-pressure brake system, the combination of a brake-piston cylinder, a main service-valve, an auxiliary reservoir, a main train-pipe, an automatic governor-valve having means adapted to increase the fluid-pressure in the main-train-pipe passages without affecting the fluid-pressure in the auxiliary reservoir or the main-service-valve chambers, substantially as set forth.

57. In an automatic fluid-pressure brake system, the combination of a brake-piston cylinder, an auxiliary reservoir, a main service-valve, a main train-pipe, an automatic governor-valve adapted to permit a change of the fluid-pressure in the main train-pipe at the will of the engineer, to a predetermined pressure, without affecting the main-service-valve device, substantially as set forth.

58. In an automatic fluid-pressure brake system, the combination of a brake-piston cylinder, an auxiliary reservoir, a main train or brake pipe and a main service-valve, means for causing an excess pressure above the normal in the main train-pipe to fill the reservoir and passages of an additional car, and means for preventing the reduction of such excess pressure from applying the brakes, substantially as set forth.

59. In an automatic fluid-pressure brake system, the combination of a brake-piston cylinder, an auxiliary reservoir, a main train-pipe, an automatic governor-valve, a main service-valve, automatic means adapted to cut off the communications between the auxiliary reservoir and the brake-piston cylinder before the normal fluid-pressure in the main train-pipe is admitted into the auxiliary reservoir through the governor-valve chamber and valve mechanism governing the fluid-pressure in the auxiliary reservoir, substantially as set forth.

60. In an automatic fluid-pressure brake system, the combination of a brake-piston cylinder, an auxiliary reservoir, a main train-pipe, an automatic governor-valve, a main service-valve, an uncontrolled passage between the auxiliary reservoir and the main service-valve automatic means to place the fluid-pressure in the main train-pipe in communication with the auxiliary reservoir and through the auxiliary reservoir to the brake-piston cylinder when the fluid-pressure in the main train-pipe is opened to an excess reduction, substantially as set forth.

61. In an automatic fluid-pressure brake system, the combination of a brake-piston cylinder, an auxiliary reservoir, a main train or brake pipe and a main service-valve, with a governor-valve for controlling the pressure in the main service-valve, a governor-valve for applying the brake by excess fluid-pressure in the main train-pipe and a valve for normally closing said governor-valve and adapted to be operated by back pressure from the brake-piston cylinder, substantially as set forth.

62. In an automatic fluid-pressure brake system, the combination of a brake-piston cylinder, an auxiliary reservoir, a main service-valve, a main train-pipe, an automatic governor-valve, automatic means for regulating the governor-valve and adapted to hold it normally closed to resist the fluid-pressure in the main train-pipe and thereby keep such pressure from affecting the device until the fluid-pressure in the main train-pipe becomes an excess fluid-pressure above the normal, said governor-valve being operative to close the exhaust-passage communicating with the brake-piston cylinder and atmosphere, thereby perpetuating any length of brake application desired and keeping or maintaining, as a reserve, the fluid-pressure in the auxiliary reservoir, equal to the normal fluid-pressure in the main train-pipe, substantially as set forth.

63. In an automatic fluid-pressure brake system, the combination of a brake-piston cylinder, an auxiliary reservoir, a main train or brake pipe and a main service-valve, with a governor-valve for controlling the pressure in the main service-valve, two governor-valves and a check-valve for causing a checking application in the brake-piston cylinder, one of said governor-valves being operated by excess pressure in the main train-pipe, the other governor-valve being operated by back pressure from the brake-piston cylinder, and the said check-valve adapted to normally close communication between the governor-valves and the brake-piston cylinder, said check-valve being adapted to be opened by back pressure from the brake-piston cylinder, substantially as set forth.

64. In an automatic fluid-pressure brake system, the combination of a brake-piston cylinder, an auxiliary reservoir, a main train or brake pipe and a main service-valve, with a governor-valve adapted to prevent the operation of the main service-valve when excess pressure in the main train or brake pipe is reduced to a point above or at normal train-pipe pressure, an automatic governor-valve adapted to supply excess fluid-pressure to the brake-piston cylinder, and a valve adapted to close communication between said automatic governor-valve and the brake-piston cylinder said valve being opened by back pressure from the brake-piston cylinder, whereby when there is no pressure in the brake-piston cylinder an excess of pressure may be produced, maintained and reduced in the main train-pipe without applying the brakes, substantially as set forth.

65. In an automatic fluid-pressure brake system, the combination of a brake-piston cylinder, an auxiliary reservoir, a main train or brake pipe and a main service-valve, with an automatic governor-valve adapted to prevent the operation of the main service-valve on a reduction of excess fluid-pressure in the main train-pipe to a point at or above normal train-pipe pressure, said governor-valve consisting of a movable flexible diaphragm secured at its outer edge, a disk hub, a spring adapted to resist the movement of the disk hub and flexible diaphragm, an abutment adapted to act as a stop to the movement of the disk hub, and a pin-valve connected to the disk hub and adapted to open and close a port under the movement of the flexible diaphragm, substantially as set forth.

66. In an automatic fluid-pressure brake system, the combination of a brake-piston cylinder, an auxiliary reservoir, a main train or brake pipe and a main service-valve, with an automatic governor-valve adapted to prevent the operation of the main service-valve on a reduction of excess pressure in the main train-pipe to a point at or above normal train-pipe pressure, said governor-valve consisting of a pressure-valve adapted to open and close the port leading from a main-train-pipe passage to the main service-valve chamber, and a flexible diaphragm or pressure valve adapted to be opened and closed under predetermined pressure from the main-service-valve chamber and to control or shut off the pressure from the main train or brake pipe which exists in the main-service-valve chamber from acting on the pressure-valve which controls the main train-pipe passage, substantially as set forth.

67. In an automatic fluid-pressure brake system, the combination of a brake-piston cylinder, an auxiliary reservoir, a main train or brake pipe and a main service-valve with an automatic governor device adapted to prevent the operation of the main service-valve on a reduction of excess pressure in the main train-pipe to a point at or above normal train-pipe pressure, said device consisting of a flexible diaphragm-valve adapted to act under pressure from the main-service-valve chamber, a piston-valve adapted to be operated by pressure admitted by the flexible diaphragm-valve and to close a passage leading from the main train or brake pipe to the main-service-valve chamber, said pressure-valve having movable means adapted to prevent the escape of fluid under pressure from the main service-valve to atmosphere when said passage is closed, substantially as set forth.

68. In an automatic fluid-pressure brake system, the combination of a brake-piston cylinder, an auxiliary reservoir, a main train or brake pipe and a main service-valve, with an automatic governor-valve adapted to prevent certain reductions of pressure in the main train or brake pipe from operating the main service-valve, said governor-valve consisting of a flexible diaphragm-valve, a pressure-valve for regulating the flow of fluid-pressure from the main train-pipe to the main-service-valve chamber and a device connected with the pressure-valve adapted to prevent the escape of fluid-pressure from the main-service-valve chamber to atmosphere, when the valve is open or closed, substantially as set forth.

69. In an automatic fluid-pressure brake system, the combination of a brake-piston cylinder, an auxiliary reservoir, a main train or brake pipe and a main service-valve, with an automatic governor-valve adapted to prevent the main service-valve from being operated by certain reductions of pressure in the main train or brake pipe, said governor-valve being adjustable so as to be set under an adjusted tension of predetermined pressure, substantially as set forth.

70. In an automatic fluid-pressure brake system, the combination of a brake-piston cylinder, an auxiliary reservoir, a main train or brake pipe and a main service-valve, with an exhaust-retaining valve and an automatic governor device, adapted to operate the retaining-valve, said device consisting of a pressure-plate, adapted to be moved by fluid-pressure in excess of normal main train or brake pipe pressure, and a valve connected with the pressure-plate and adapted to be opened by the movement of the pressure-plate to admit said excess fluid-pressure against the exhaust-retaining valve and close the same at the will of the engineer, substantially as set forth.

71. In an automatic fluid-pressure brake system, the combination of a brake-piston cylinder, an auxiliary reservoir, a main train-pipe, an automatic governor device having a pressure-valve and a piston-valve, the stem of said piston-valve being provided with a packing-ring to prevent any loss of fluid-pressure, substantially as set forth.

72. In an automatic fluid-pressure brake system, the combination of a brake-piston cylinder, an auxiliary reservoir, a main train or brake pipe and a main service-valve with an exhaust-retaining valve having a spring which serves to hold the valve normally open, and an automatic governing device adapted to admit fluid-pressure in excess of the normal train-pipe pressure to said retaining-valve to overcome the tension of the governor-spring and to close the exhaust-retaining valve, substantially as set forth.

73. In an automatic fluid-pressure brake system, the combination of a brake-piston cylinder, an auxiliary reservoir, a main train or brake pipe, and a main service-valve, with an automatic governor device for preventing the main service-valve from being operated by certain reductions of pressure in the main train-pipe, an exhaust-retaining valve adapted to be normally held open and to be closed by excess fluid-pressure in the main train-pipe, and an automatic governor-valve adapted to be opened and closed by the production and reduction of excess pressure in the main train or brake pipe and to admit and shut off said excess pressure from the brake-piston cylinder, substantially as set forth.

74. In an automatic fluid-pressure brake system, the combination of a brake-piston cylinder, an auxiliary reservoir, a main train or brake pipe and a main service-valve, with a governor device for preventing the main service-valve from being operated by certain reductions of pressure in the main train or brake pipe, an exhaust-retaining valve adapted to be normally held open and to be closed by excess fluid-pressure, an automatic governor device for admitting excess fluid-pressure to the exhaust-retaining valve to close the same, a valve adapted to be opened by back pressure from the brake-piston cylinder, and an automatic governor device adapted to admit fluid-pressure to the brake-piston cylinder when said valve is opened, substantially as set forth.

75. In an automatic fluid-pressure brake system, the combination of a brake-piston cylinder, an auxiliary reservoir, a main train or brake pipe and a main service-valve, with an automatic governor device for preventing the operation of the main service-valve under certain reductions of pressure in the main train-pipe, an exhaust-retaining valve adapted to be held normally open and adapted to be closed by fluid-pressure in excess of main-train-pipe pressure, a governor device for admitting such excess pressure to the exhaust-retaining valve, governor devices for admitting fluid-pressure to the brake-piston cylinder and adapted to be operated by back pressure from the brake-piston cylinder and by fluid-pressure in excess of main-train-pipe pressure, and a governor device for admitting a greater excess pressure to the brake-piston cylinder and adapted to be operated by such greater excess fluid-pressure, substantially as set forth.

76. In an automatic fluid-pressure brake system, the combination of a brake-piston cylinder, an auxiliary reservoir, a main train or brake pipe, and a main service-valve with an exhaust-retaining valve and exhaust-governor valve, a governor-valve for preventing certain reductions of pressure in the main train-pipe from operating the main service-valve, a governor-valve adapted to be operated by back pressure from the brake-piston cylinder and when this pressure is below a predetermined point adapted to admit excess train-pipe pressure to a second governor-valve which is adapted to be opened by excess train-pipe pressure and to admit said pressure to the brake-piston cylinder, and a valve held normally closed and adapted to be opened by back pressure from the brake-piston cylinder in order to bring said checking devices into operation, substantially as set forth.

77. In an automatic fluid-pressure brake system, the combination of a brake-piston cylinder, an auxiliary reservoir, an automatic governor-retaining valve, a main train-pipe, a main-service-valve member normally held to its seat, moving between pistons, and having a recess on the under side which admits the fluid-pressure through ports in its seat and through said recesses, from the brake-piston cylinder into the automatic governor-retaining-valve chamber, the fluid in such chamber being held there or released at the will of the engineer by an increase or decrease of excess pressure in the main train-pipe, substantially as set forth.

78. In an automatic fluid-pressure brake system, the combinatian of a brake-piston cylinder, an auxiliary reservoir, a main train-pipe, an automatic governor-valve for regulating the pressure in the brake-piston cylinder, and an automatic governor-valve for admitting pressure through the first governor-valve so as to control the fluid-pressure in the application of the brakes while descending a grade, substantially as set forth.

79. In an automatic fluid-pressure brake system, the combination of a brake-piston cylinder, a main service-valve, an auxiliary reservoir, a main train-pipe, a multiple number of automatic governor-valves, the purpose of said valves being to govern, admit, or retain the fluid-pressure in a main-train-pipe passage, an auxiliary reservoir, and a brake-piston cylinder, substantially as set forth.

80. In an automatic fluid-pressure brake system, the combination of a brake-piston cylinder, an auxiliary reservoir, a main train or brake pipe, and a main service-valve, an automatic governor-valve adapted to close the exhaust-passage and operated with the same excess pressure that automatic means operates, and controls the fluid-pressure in the main-service-valve chamber, after the main service-valve has been shifted to a released position, a check or non-return valve adapted to admit a higher fluid-pressure in the brake-piston cylinder from the auxiliary reservoir, an always-open passage between the flexible diaphragm-chamber of the device that governs the fluid-pressure in the main-service-valve chamber and the main-service-valve chamber, also with the auxiliary reservoir, so that the fluid under pressure in the auxiliary reservoir, main-service-valve chamber and the flexible diaphragm-chamber is equal, when an excess of pressure exists in the main train or brake pipe, substantially as set forth.

81. In an automatic fluid-pressure brake system, the combination of a brake-piston cylinder, an auxiliary reservoir, a main train-pipe, a valve device admitting a higher fluid-pressure into the brake-piston cylinder through the high-pressure fluid-port in the valve-chamber leading from the auxiliary reservoir, and a non-return valve, substantially as set forth.

82. In an automatic fluid-pressure brake system, the combination of a brake-piston cylinder, a main service-valve, an auxiliary reservoir, a main train-pipe, an automatic governor-valve for controlling the pressure in the auxiliary reservoir, said device being located in the main-train-pipe passage between the coupling end of such passage and the auxiliary reservoir, substantially as set forth.

83. In an automatic fluid-pressure brake system, the combination of a brake-piston cylinder, a main train or brake pipe, an auxiliary reservoir, and a main service-valve, an automatic governor-valve for controlling the fluid-pressure in the auxiliary reservoir and main-service-valve chamber, when the fluid-pressure in the main train or brake pipe contains an excess pressure above the normal, for the purpose of operating a governor device to close the exhaust-passage leading from the brake-piston cylinder to the atmosphere, an always-open passage between the inner face of the driving-piston and the auxiliary reservoir, an always-open passage between the main-service-valve chamber and the flexible diaphragm-chamber of the governor device, substantially as set forth.

84. In an automatic fluid-pressure brake system, the combination of an auxiliary reservoir, a main train or brake pipe, a brake-piston cylinder, and a main service-valve, having normal open passages from the brake-piston cylinder to the atmosphere, a normal open passage between the auxiliary reservoir and the main-service-valve chamber with a controlling device adapted to cut off the fluid-pressure that exists in the main train or brake pipe above the normal from flowing into the main-service-valve chamber, said device controls or governs all that fluid under pressure between the inner face of the driving-piston and the auxiliary reservoir, the excess pressure in the main train or brake pipe adapted to operate means to perpetuate an application of the brakes, substantially as set forth.

85. In an automatic fluid-pressure brake system, the combination of a brake-piston cylinder, an auxiliary reservoir, an automatic governor-retaining valve, a main train-pipe, a main-service-valve chest or casing, having its service slide-valve and piston-cylinder valve-bushing provided with ports and passages for the admission of fluid under pressure from the auxiliary reservoir, and from the main train-pipe into the brake-piston cylinder, and for the exhaust of fluid under pressure from the brake-piston cylinder into the automatic governor-retaining-valve chamber, a valve operated by main-train-pipe pressure, and a supplemental check or non-return valve chamber connected with the main service slide-valve and piston-cylinder valve-chamber, passages from the check-valve chamber to the brake-piston cylinder, a spring holding the check or non-return valve normally closed in the check-valve chamber, the purpose of the check or non-return valve being to admit fluid under pressure from the slide-valve and piston-cylinder chamber into the brake-piston cylinder, substantially as set forth.

86. In an automatic fluid-pressure brake system, the combination of a brake-piston cylinder, an auxiliary reservoir, a main train-pipe, a main-service-valve chest or casing, having its main service slide-valve moving in a bushing-chamber communicating with the supplemental check or non-return valve, with the auxiliary reservoir and with the main train-pipe, a supplemental valve checking the flow of fluid, when under pressure, from the brake-piston cylinder and through the exhaust-passage to the automatic governor-retaining-valve mechanism, and imparting a high pressure of fluid from the auxiliary reservoir into the brake-piston cylinder, whereby the driving-piston is forced from its seat by fluid-pressure from the auxiliary reservoir so as to impart a movement to said non-return valve, and a passage establishing communications between said check or non-return valve chamber and the auxiliary reservoir with the brake-piston cylinder, through the service slide-valve and chamber of the main service-valve, substantially as set forth.

87. In an automatic fluid-pressure brake system, the combination of a brake-piston cylinder, an auxiliary reservoir, a main train-pipe, a main service-valve controlled by the driving-piston, an automatic governor-retaining valve, adapted to be closed by fluid-pressure in excess of normal train-pipe pressure, a passage leading from the brake-piston cylinder to the service slide-valve, and a passage leading from the service slide-valve to the governor-retaining valve, the slide-valve being adapted to admit the flow of fluid under pressure from the auxiliary reservoir and direct from the main train-pipe into the brake-piston cylinder when a service or other brake application is desired, and the passages and service slide-valve being adapted to allow the fluid under pressure to pass or exhaust from the brake-piston cylinder to the governor-retaining valve and thence to atmosphere, substantially as set forth.

88. In an automatic fluid-pressure brake system, the combination of a brake-piston cylinder, an auxiliary reservoir, a main train-pipe, a main service-valve, a main-train-pipe passage leading from the main train-pipe to the auxiliary reservoir, a non-return or check valve located in said passage and unobstructed passage connecting the main service-valve with the auxiliary reservoir, substantially as set forth.

89. In an automatic fluid-pressure brake system, the combination of a brake-piston cylinder, an auxiliary reservoir, a main train-pipe, means for admitting fluid-pressure into the brake-piston cylinder from the auxiliary reservoir when said fluid-pressure exceeds that of the fluid-pressure in the main train-pipe, and from the main train-pipe to the brake-piston cylinder; a fluid-pressure automatic governor-retaining valve adapted to open when affected by excess fluid-pressure from a suitable source of supply and to close the exhaust-port, thus retaining the fluid-pressure in the brake-piston cylinder any length of time desired, and an automatic governor-valve controlling the flow of fluid-pressure from the main train-pipe to the brake-piston cylinder, said governor-valve being operative on increase of fluid-pressure, substantially as set forth.

90. In an automatic fluid-pressure brake system, the combination of a brake-piston cylinder, an auxiliary reservoir, a main train-pipe, a normally open fluid-pressure-retaining automatic governor-valve, an automatic governor-valve controlling the flow of fluid-pressure through the exhaust-passages from the brake-piston cylinder to atmosphere, said governor-valves being operated by an increase of fluid-pressure from a suitable source of supply, substantially as set forth.

91. In an automatic fluid-pressure brake system, the combination of a brake-piston cylinder, an auxiliary reservoir, a main train-pipe, a main service-valve, an automatic governor-valve communicating with the main train-pipe passage leading to the auxiliary reservoir, the inlet-port of said governor-valve communicating with a suitable source of supply of fluid-pressure and with the passages leading from the main train-pipe to the auxiliary reservoir, so that the said governor-valve regulates the fluid-pressure in the auxiliary reservoir and in the main-service-valve chamber to a predetermined fluid-pressure, substantially as set forth.

92. In an automatic fluid-pressure brake system, the combination of a brake-piston cylinder, an auxiliary reservoir, an automatic governor-valve, a main train-pipe, a passage leading from the main train-pipe through the governor-valve to the auxiliary reservoir, a main service-valve, a passage controlled by the main service-valve and leading from the main train-pipe to the auxiliary reservoir, said main service-valve being adapted to close the passage leading from the main train-pipe through the automatic governor-valve to the auxiliary reservoir, and to open the passage controlled by the service-valve and leading from the main train-pipe to the auxiliary reservoir, upon a reduction of fluid-pressure in the main train-pipe, substantially as set forth.

93. In an automatic fluid-pressure brake system, the combination of a brake-piston cylinder, a main service-valve, an auxiliary reservoir, a main train-pipe, a passage connecting the main train-pipe and the auxiliary reservoir, a passage connecting the auxiliary reservoir and the brake-piston cylinder, a passage connecting the main train-pipe and the brake-piston cylinder, and an automatic governor-valve for admitting fluid-pressure from the main train-pipe to the brake-piston cylinder, substantially as set forth.

94. In an automatic fluid-pressure brake system, the combination of a brake-piston cylinder, an auxiliary reservoir, a main train-pipe, a main service-valve having a driving-piston, an automatic governor-valve, a port opening from the driving-piston chamber to a passage leading through the automatic governor-valve chamber and to the auxiliary reservoir, said port being adapted to be so operated by the movement of the driving-piston that the port shall not be opened until the main service-valve has been closed, substantially as set forth.

95. In an automatic fluid-pressure brake system, the combination of a brake-piston cylinder, an auxiliary reservoir, a main train-pipe, a main service-valve, and an automatic governor-valve adapted to be operated by fluid-pressure from a suitable source of supply, and to close and open communication between the main train-pipe and the auxiliary reservoir, substantially as set forth.

96. In an automatic fluid-pressure brake system, the combination of a brake-piston cylinder, an auxiliary reservoir, a main train-pipe, an automatic governor-retaining valve, and an automatic governor admission-valve, whereby the engineer is enabled to decrease or increase the fluid-pressure in the brake-piston cylinder at will, substantially as set forth.

97. In an automatic fluid-pressure brake system, the combination of a brake-piston cylinder, an auxiliary reservoir, a main train-pipe, a main service-valve, an automatic governor exhaust-retaining valve said valve being independent of the auxiliary reservoir and being adapted to be operated by fluid-pressure in excess of train-pipe pressure, triple ports arranged in the slide-valve and leading to the brake-piston cylinder, one of which ports is of greater area than the others, whereby the port of greater area may be employed to charge the brake-piston cylinder at emergency application, and a port of less area may be employed to lead to the exhaust and thus check the exhaust before the automatic governor-retaining valve is closed to perpetuate an application of the brakes, substantially as set forth.

98. In an automatic fluid-pressure brake system, the combination of a brake-piston cylinder, an auxiliary reservoir, a main train-pipe, an automatic governor-valve chamber, a passage communicating with said governor-valve chamber, the main-service-valve chamber, and auxiliary reservoir, and a passage leading to the main train-pipe or other source of supply, substantially as set forth.

99. In an automatic fluid-pressure brake system, the combination of a brake-piston cylinder, an auxiliary reservoir, a main train-pipe, an automatic governor-valve chamber, a passage communicating with said governor-valve chamber and the brake-piston cylinder, a passage leading to the main train-pipe or other source of supply to make an application of the brakes, substantially as set forth.

100. In an automatic fluid-pressure brake system, the combination of a brake-piston cylinder, an auxiliary reservoir, a main train-pipe, an automatic governor or regulating device, means adapted to centrally guide the valve to its seat, and flexible means to hold the said valve to the inner end of the disk-hub, thereby compensating for the wear of the same, substantially as set forth.

In testimony whereof I affix my signature in presence of two witnesses.

JOHN SCOTT BUBB.

Witnesses:
W. POLLOCK,
H. A. COLWELL.